US009021214B2

(12) United States Patent
Sakashita et al.

(10) Patent No.: US 9,021,214 B2
(45) Date of Patent: Apr. 28, 2015

(54) STORAGE SYSTEM AND METHOD FOR CONTROLLING MEMORY IN STORAGE SYSTEM

(75) Inventors: Yuki Sakashita, Yokohama (JP); Shintaro Kudo, Yokohama (JP); Yusuke Nonaka, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 119 days.

(21) Appl. No.: 13/380,218

(22) PCT Filed: Dec. 14, 2011

(86) PCT No.: PCT/JP2011/006989
§ 371 (c)(1),
(2), (4) Date: Dec. 22, 2011

(87) PCT Pub. No.: WO2013/088473
PCT Pub. Date: Jun. 20, 2013

(65) Prior Publication Data
US 2013/0159620 A1 Jun. 20, 2013

(51) Int. Cl.
*G06F 12/00* (2006.01)
*G06F 3/06* (2006.01)
(52) U.S. Cl.
CPC ............ *G06F 3/0658* (2013.01); *G06F 3/0689* (2013.01); *G06F 3/0626* (2013.01); *G06F 3/067* (2013.01)
(58) Field of Classification Search
None
See application file for complete search history.

(56) References Cited

U.S. PATENT DOCUMENTS

| 6,108,739 | A * | 8/2000 | James et al. ................... 710/113 |
| 6,108,755 | A * | 8/2000 | Kabemoto et al. ............. 711/147 |
| 6,571,324 | B1 * | 5/2003 | Elkington et al. ............. 711/162 |
| 7,970,992 | B1 * | 6/2011 | Michael et al. ................ 711/114 |
| 2004/0230619 | A1 * | 11/2004 | Blanco et al. .................. 707/200 |
| 2005/0015544 | A1 * | 1/2005 | Zohar et al. ................... 711/113 |
| 2007/0174541 | A1 * | 7/2007 | Chandrasekaran et al. .. 711/100 |
| 2008/0244183 | A1 * | 10/2008 | Ishikawa et al. ............... 711/129 |

(Continued)

FOREIGN PATENT DOCUMENTS

EP    1 691 293 A1    8/2006
JP    2010-086211    4/2010

OTHER PUBLICATIONS

PCT International Search Report and Written Opinion on application PCT/JP2011/006989 mailed Aug. 6, 2012; 13 pages.

*Primary Examiner* — Jared Rutz
*Assistant Examiner* — Brendan Lillis
(74) *Attorney, Agent, or Firm* — Foley & Lardner LLP

(57) ABSTRACT

According to a storage system of a prior art adopting a cluster structure, various types of large-capacity memories were arranged to enhance the access performance, so that the system required a dedicated control circuit, and there was difficulty in realizing cost reduction and improvement of access performance simultaneously. In order to solve the problems, the present invention provides a storage system in which a group of memories is integrated to MPU memories directly coupled to MPUs in respective controller units, wherein each MPU memory is divided into a duplication information area and a non-duplication information area, and attribute information for controlling accesses thereto are provided. Further, each duplication information area is provided with a double master information area capable of referring to a first memory and a second memory and a single master information area capable of referring only to either the first memory or the second memory, and the accesses thereto are performed based on the attribute information.

15 Claims, 19 Drawing Sheets

(56) References Cited

U.S. PATENT DOCUMENTS

| | | |
|---|---|---|
| 2010/0083120 A1 | 4/2010 | Ito et al. |
| 2011/0106778 A1* | 5/2011 | Chan et al. .................... 707/704 |
| 2012/0011326 A1* | 1/2012 | Higashijima et al. ......... 711/142 |

* cited by examiner

Pair information management table 120

| Pair number | P-VOL | S-VOL | Pair status |
|---|---|---|---|
| 0 | 300 | 400 | Synchronized |
| 1 | 301 | 401 | Non-synchronized |
| 2 | 302 | 402 | Synchronized |
| ... | ... | ... | ... |

Fig.5

Difference bit table 121

| Block number | Pair 0 | Pair 1 | Pair 2 |
|---|---|---|---|
| 10000 | 0 | 1 | 0 |
| 10001 | 0 | 0 | 0 |
| 10002 | 0 | 0 | 0 |
| 10003 | 0 | 1 | 0 |
| 10004 | 0 | 0 | 0 |
| 10005 | 0 | 0 | 0 |
| 10006 | 0 | 1 | 0 |
| 10007 | 0 | 1 | 0 |
| 10008 | 0 | 0 | 0 |
| 10009 | 0 | 0 | 0 |
| ... | ... | ... | ... |

Control information characteristics table 122

| Control information name | Write ratio | Control information belonging to LU | Belonging LU number |
|---|---|---|---|
| Pair information management table | 0.1% | YES | 201 |
| Difference bit table | 99.0% | YES | 202 |
| Statistical information | 30.0% | NO | NULL |
| System configuration information | 0% | NO | NULL |
| ... | ... | ... | ... |

Fig.9

Control information address table 123

| Address | Control information name |
|---|---|
| 0x1000~0x10FF | Pair information management table |
| 0x1100~0x11FF | Difference bit table |
| 0x1200~0x12FF | Statistical information |
| 0x1300~0x13FF | System configuration information |
| 0x1400~0x14FF | Pair information management table |
| ... | ... |

Fig.10

LU ownership table 124

| LU number (1240) | LU ownership (1241) |
|---|---|
| 201 | CTLa |
| 202 | CTLb |
| 203 | CTLa |
| ... | ... |

Fig.11

Master side information table 110

| Address (1100) | Master type (1101) | Master side (1102) |
|---|---|---|
| 0x1000~0x10FF | Double master information | NULL |
| 0x1100~0x11FF | Single master information | SMa |
| 0x1200~0x12FF | Single master information | SMb |
| 0x1300~0x13FF | Double master information | NULL |
| ... | ... | ... |

STORAGE SYSTEM AND METHOD FOR CONTROLLING MEMORY IN STORAGE SYSTEM

TECHNICAL FIELD

The present invention relates to a storage system and a method for controlling memories in the storage system, which is preferably applied to a cluster control technique of controllers.

BACKGROUND ART

In a storage system having controller units adopting a cluster structure (hereinafter abbreviated as CTL), a data cache or a disk pool and the like are shared among the respective CTLs, and a shared memory (hereinafter abbreviated as SM) is used to manage the same. The storage system prepares an area called a duplication area for storing a control information in the SM that must not be lost (hereinafter referred to as duplication information) and control information is stored thereto in duplicated manner so that the values of SMs arranged in two CTLs correspond. Other control information (hereinafter referred to as non-duplication information) are stored in the area called a non-duplication area.

Patent literature 1 discloses an art capable of accessing the SMs from all the micro-processors (hereinafter abbreviated as MPUs) by the same access cost (access performance such as access time). Patent literature 1 also discloses an art related to SM cache. The SM cache technique relates to caching a portion of the contents of the SM in a local memory (hereinafter abbreviated as LM) directly coupled to an MPU that can be accessed from the MPU more speedily than accessing the SM, according to which the SM access performance is enhanced. This technique enables to improve the access performance of the MPU to the SM. Patent literature 1 also discloses a method for controlling a cache memory (hereinafter abbreviated as CM) for temporarily storing data from the host computer or data from the drive unit, which differs from the SM or the LM.

CITATION LIST

Patent Literature

PTL 1: Japanese Patent Publication No. 2010-086211 (US Patent Application Publication No. 2010/0083120)

SUMMARY OF INVENTION

Technical Problem

Recently, there are demands for constituting a storage system having a dual CTL using inexpensive general-purpose hardware components in order to cut down the overall costs of the system. One example of the hardware configuration of such system includes two CTLs each having devices for coupling MPUs, LMs and CTLs, wherein the devices of the CTLs are coupled via a high speed bus with a transfer rate of 5 Gbps or higher, wherein the LMs coupled to the MPUs are used as shared memories.

One of the two CTLs is called an "internal system" CTL and the other one is called an "external system" CTL, which are distinguished by different references, CTLa and CTLb. In this case, from the viewpoint of CTLa, CTLa and the respective components of CTLa are referred to as the "internal system" while CTLb and the respective components of CTLb are referred to as the "external system". On the other hand, from the viewpoint of CTLb, CTLb is the internal system and CTLa is the external system. In the above-mentioned storage system, the MPU is capable of accessing the external system memory via a device for coupling CTLs. However, since the access is performed via devices for coupling CTLs, the access performance is deteriorated compared to the case where access is performed directly to the internal system memory. In other words, there is a difference between the access cost (access time) to the internal system and the access cost to the external system.

Further, non-duplication information is control information that is stored only in one of the SMs. In order to prevent deterioration of access performance, it is necessary to adopt a system for arranging data so as to reduce the frequency of accesses to the external system. As for duplication information, it is necessary to adopt a reference and update method capable of preventing deterioration of consistency in which the internal system and the external system refer to different values while enabling high speed access.

However, the SM control method disclosed in patent literature 1 requires various types of large-capacity memories, and the costs of the memories are high. The hardware for controlling the various types of memories is complex and must use uniquely developed and dedicated components. Therefore, according to the prior art technique, it was difficult to realize cost reduction and improvement of access performance at the same time. The present invention aims at providing a system and a method for controlling memories capable of realizing a higher access performance than the prior art system while achieving cost reduction.

Solution to Problem

In order to solve the problems mentioned above, the present invention provides a storage system comprising a first controller having a first processor and a first memory coupled to the first processor and having a local area for storing information accessible only from the first processor and a shared memory area having a first area and a second area, a second controller having a second processor and a second memory coupled to the first processor and having a local area for storing information accessible only from the second processor and a shared memory area having a first area and a second area, wherein the first memory is coupled to the second processor, the second memory is coupled to the first processor, the first processor or the second processor performs duplex writing of a first control information to the first area of the first and second memories, the duplicated first control information capable of being read from both the first processor and the second processor, and the first processor or the second processor performs duplex writing of a second control information to the second area of the first and second memories, wherein only one of the duplicated second control information is permitted to be read from both the first processor and the second processor.

Further according to the storage system of the present invention, when the first processor updates the first control information subjected to duplex writing to the first and second memories, writing of data by the second processor to the shared area of the first and second memories is not permitted until the update is completed.

Even further, the storage system of the present invention characterizes in that one of the first controller or the second controller is assigned as the controller for controlling an I/O with respect to the logical unit for each of the plurality of logical units, and regarding a control information unique to any one of the plurality of logical units out of the second control information, only the control information written in the first memory or the second memory of the controller assigned to said logical unit is permitted to be read from the first processor and the second processor.

In addition, according to the storage system of the present invention, an update frequency of the first control information is smaller than an update frequency of the second control information, or a number of times of update of the first control information is greater than a predetermined threshold. Further according to the storage system of the present invention, the first control information includes either a copy pair information of the logical unit or a system configuration information, and the second control information includes either a difference information of a copy pair of the logical unit or a statistical information.

Advantageous Effects of Invention

The present invention enables to realize a storage system using inexpensive general-purpose components, capable of cutting down development and manufacturing costs. Further, the present invention enables to reduce the frequency of accesses from an external system MPU to an internal system SM, according to which the performance of the SM access can be improved. In addition, by restricting the target of SM cache to only the external system SM, the occurrence of excessive copying of data among SMs can be reduced, and the SM cache memory capacity can be cut down, according to which the costs of the system can be cut down and the I/O performance thereof can be improved.

BRIEF DESCRIPTION OF DRAWINGS

FIG. 5 is a view showing one example of a difference bit table of a local copy.

FIG. 8 is a view showing one example of a control information characteristics table.

FIG. 9 is a view showing one example of a control information address table.

FIG. 10 is a view showing one example of an LU (Logical Unit) ownership table.

FIG. 11 is a view showing one example of a master side information table.

DESCRIPTION OF EMBODIMENTS

Now, the preferred embodiments of the present invention will be described with reference to the drawings. The illustrated embodiments are mere examples for realizing the present invention, and they do not restrict the technical range of the present invention. The common components in the respective drawings may be denoted with the same reference numbers. The first embodiment illustrates a method for determining a master side of a duplication information based on an access characteristics or an LU ownership. Next, the second embodiment illustrates a method for caching only the control information of an external system to an SM cache. Finally, the third embodiment illustrates a method for arranging a data cache management information in an SM of a CTL having the ownership thereof.

Embodiment 1

Figure 1:
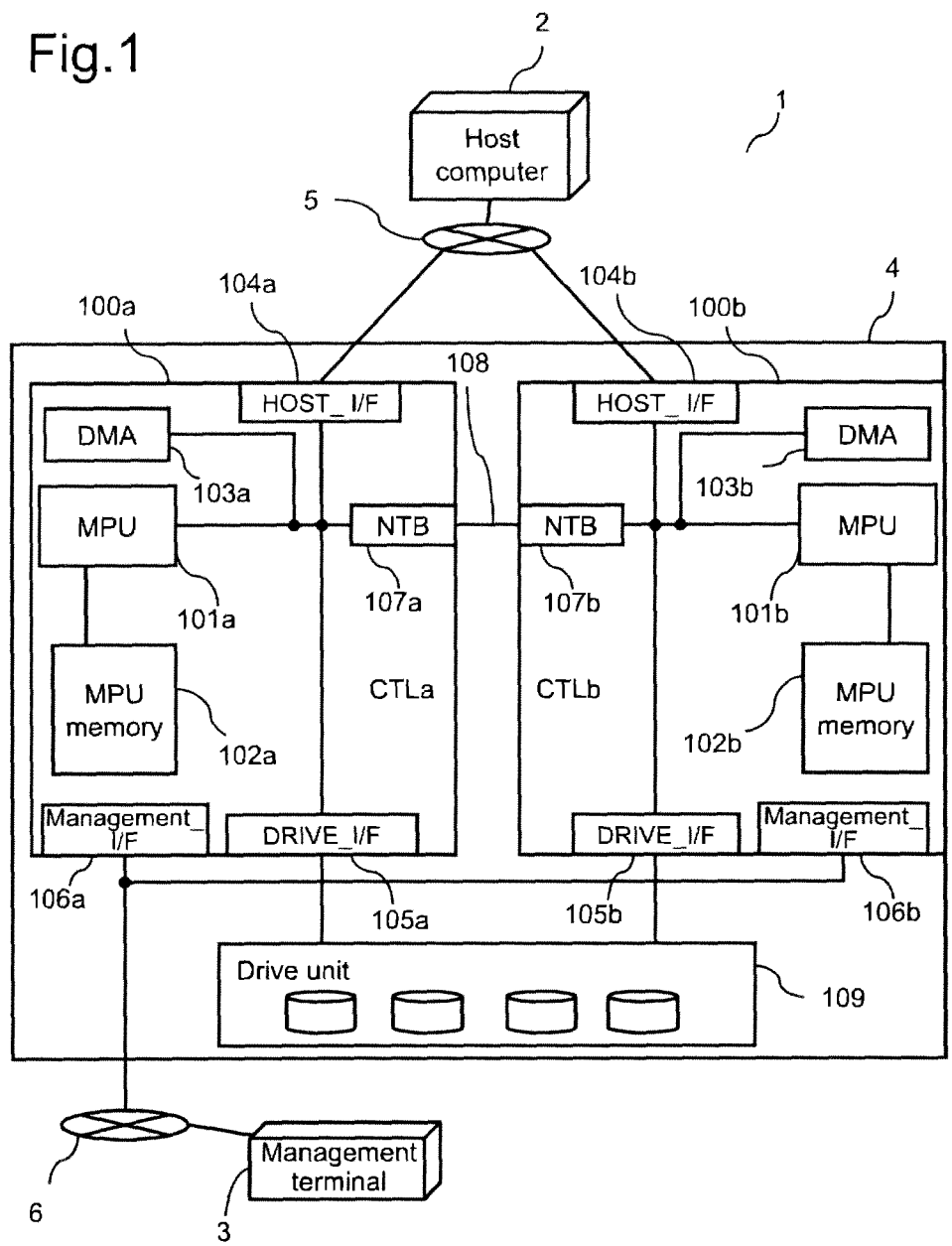
FIG. 1 is a block diagram showing an overall configuration of a computer system according to a preferred embodiment of the present invention.

Now, the system for determining a master side of a duplication information based on an access characteristics or an LU ownership according to the first embodiment of the present invention will be described with reference to FIGS. 1 through 19. FIG. 1 is a block diagram illustrating an overall configuration of a computer system according to the present embodiment. In FIG. 1, a computer system 1 is composed of a host computer 2, a management terminal 3, a storage system 4, and networks such as a SAN (Storage Area Network) 5 and a LAN (Local Area Network) 6. The host computer 2 is coupled via the SAN 5 with respective storage systems 4, and the management terminal 3 is coupled via the LAN 6 with the storage system 4. The host computer 2 can be a mainframe, a server or a client terminal, for example. The management terminal 3 can be coupled directly to the storage system 4 instead of via the LAN 6.

The storage system 4 shown in FIG. 1 comprises two controllers CTL 100a and 100b and a drive unit 109 controlled via the two controllers CTL 100a and 100b. Hereinafter, CTL 100a is called "CTLa" and CTL 100b is called "CTLb". Further, upon referring to a component within one of the CTLs, a portion of the name of the CTL is attached. For example, the SM being a component of CTLa is called "SMa" having the letter "a" attached at the end, and the SM being a component of CTLb is called "SMb" having the letter "b" attached at the end. Thereby, it becomes possible to recognize which CTL a component belongs to when there are similar components that must be distinguished.

If there is no need to distinguish whether a component belongs to CTLa or CTLb, the component is referred to without attaching the letter "a" or "b" at the end. For example, if it is not necessary to distinguish MPU 101a and MPU 101b, the component is merely referred to as "MPU 101", and if it is not necessary to distinguish MPU a and MPU b, the component is merely referred to as MPU.

Each of the CTLa and CTLb comprises, respectively, an MPU 101a or 101b, an MPU memory 102a or 102b, a DMA (Direct Memory Access) circuit 103a or 103b, a HOST_I/F 104a or 104b, a DRIVE_I/F 105a or 105b, a management_I/F 106a or 106b, and an NTB (Non Transparent Bridge) 107a or 107h which is a device for coupling CTLs.

The CTLa and CTLb are coupled via the NTB 107a and 107b through a full-duplex high speed bus 108 with a transfer rate of 5 Gbps or higher, through which user data and control information can be exchanged. Further, the CTLa and CTLb communicate via the HOST_I/F 104a and 104b with the host computer 2, communicate via the DRIVE_I/F 105a and 105b with the drive unit 109, and communicate via the management_I/F 106a and 106b with the management terminal 2. Although not shown, the drive unit 109 has a plurality of LUs (Logical Units) formed therein.

Figure 2:
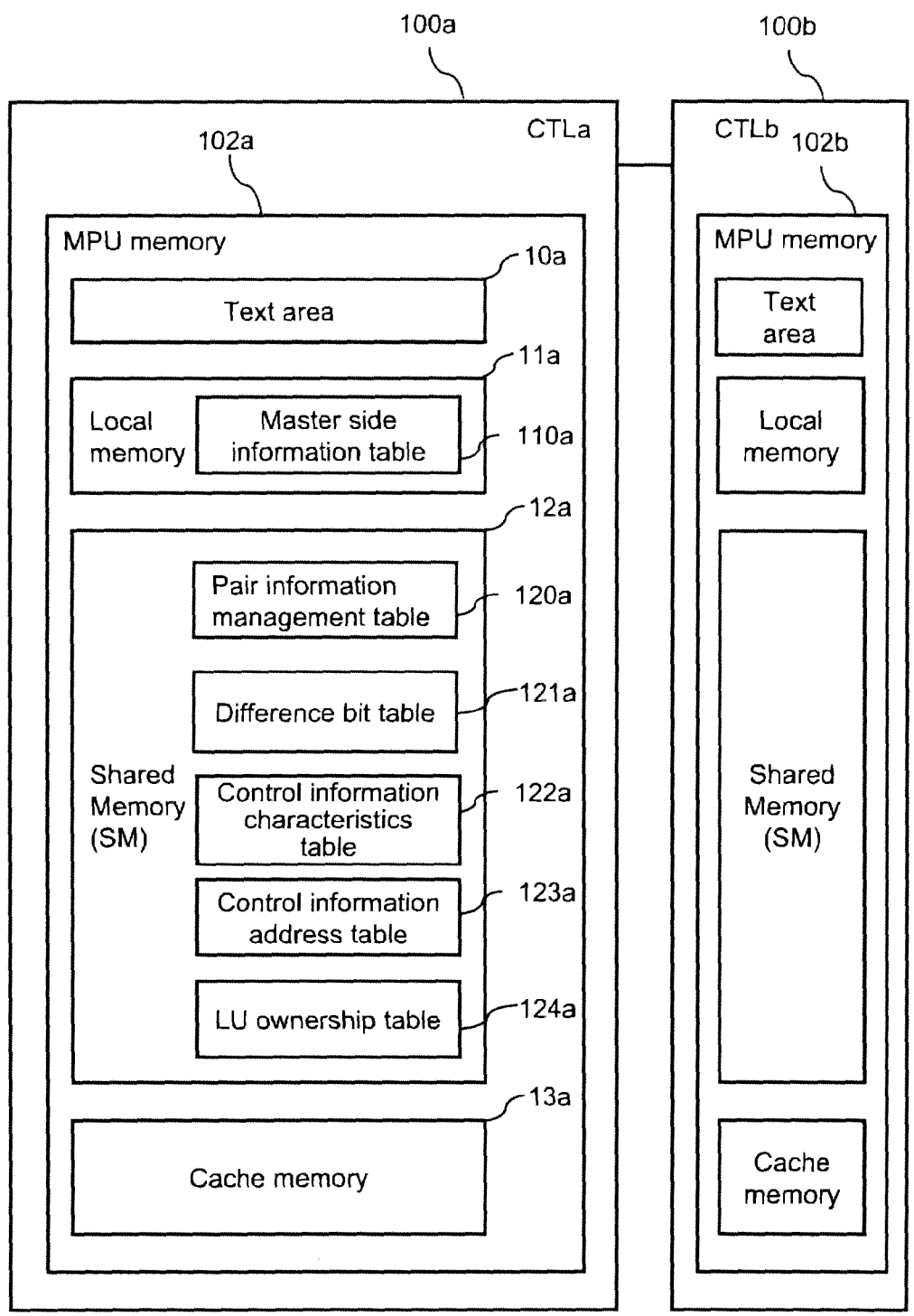
FIG. 2 is a configuration diagram of an MPU memory according to the embodiment of the present invention.

FIG. 2 is a configuration diagram of an MPU memory according to the embodiment of the present invention. The configuration of a program, control information and data stored in an MPU memory will be described with reference to FIG. 2. Each MPU memory 102 has areas (address ranges) referred to as a text area 10, a local memory 11, a shared memory (hereinafter referred to as SM) 12 and a cache memory 13, each area storing programs, control information and various data. The CTLa has the MPU memory 102a, and the CTLb has the MPU memory 102b. In the prior art system, the shared memory, the local memory and the cache memory are formed independently, but according to the present invention, they are integrated into a single memory as MPU memory.

Figures 3, 4:
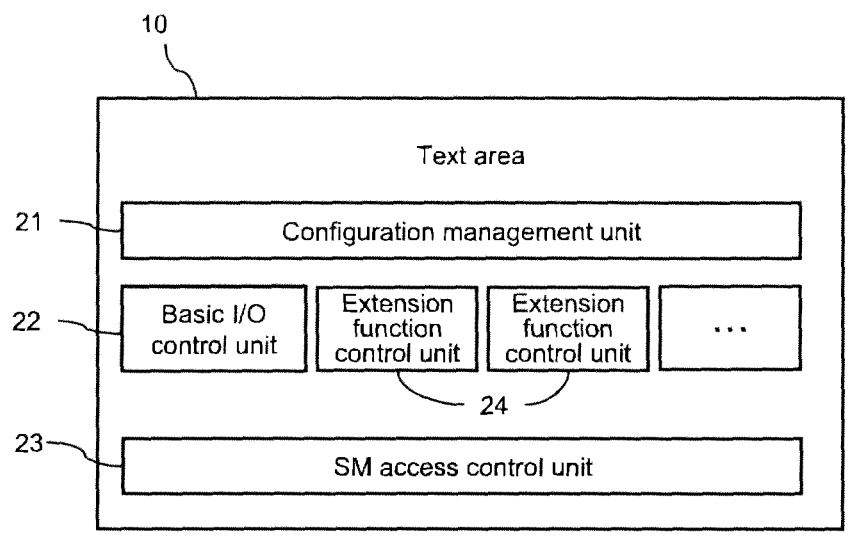
FIG. 3 is a software configuration diagram according to the embodiment of the present invention.
FIG. 4 is a view showing one example of a pair information management table of a local copy.

FIG. 3 is a software configuration diagram according to the embodiment of the present invention. The text area 10 stores various programs for executing processes and functions of the storage system shown in FIG. 3. The local memory 11 stores tables and the like which are referred to from the programs operating in the CTL but not referred to from programs in an external system. The local memory 11 stores a master side information table 110, for example. The SM 12 stores control information shared by both CTLs. The aforementioned control information include a control information to be duplicated, in other words, control information that must be arranged in duplicated manner in SMs of both CTLs so that the information will not be lost even if failure occurs to one of the CTLs, and non-duplication information that will not be duplicated.

Further, it is necessary that the same values can be referred to consistently as control information from either MPUs. The control information stored in the SM 12 are, for example, a pair information management table 120, a difference bit table 121, a control information characteristics table 122, a control information address table 123 and an LU ownership table 124. The CTL in charge of the I/O (Input/Output) processes to the respective LUs is called an owner CTL, the state of which can be expressed that the CTL has the LU ownership.

The cache memory 13 is an area for temporarily retaining the user data from the host computer 2 or the user data stored in the disk. In other words, in order to prevent accesses to be performed to the disk requiring a long access time every time, a portion of the user data of the disk is stored in the cache memory that can be accessed in a shorter time than the disk. Furthermore, the cache memory serves to increase the speed of access from the host computer 2 to the storage system 4.

The text area 10 of the MPU memory 102 shown in FIG. 3 stores programs which are software for implementing the various processes in the storage system. Actually, various programs including a configuration management unit 21, a basic I/O control unit 22, an SM access control unit 23 and a plurality of extension function control units 24 are stored in the text area, and the MPU arbitrarily accesses the same and executes the processes.

The configuration management unit 21 is a program for referring to and updating the configuration management information based on commands from the management terminal 3 or from other program modules. The basic I/O control unit 22 is a program for receiving orders from the host computer 2 and executing a process for referring to and updating the data. When the basic I/O control unit 22 is implemented, a part of the process is executed by invoking a program SM access control unit 23 or the like if necessary. The SM access control unit 23 is a program that is invoked when the configuration management unit 21 or the basic I/O control unit 22 accesses the SM for implementing a process for referring to and updating the control information of the SM.

The extension function control unit 24 is a program that implements extension functions such as a local copy function, a virtual volume function and a snapshot function as described later, and constitutes independent program modules for each function. A local copy function is a function for copying the contents of one LU to the other LU when there are two LUs, and in the local copy function, control information which are a pair information management table and a difference bit table are used.

FIG. 4 is a view showing one example of a pair information management table in the local copy function. The pair information management table 120 of FIG. 4 is a table for managing the pair status of a P-VOL (Primary Volume) and an S-VOL (Secondary Volume), wherein the table is referred to from the extension function control unit 24 of the local copy, and the table is composed of a P-VOL number 1201, an S-VOL number 1202 and a pair status 1203 corresponding to a pair number 1200. The pair information management table is also referred to as a copy pair information. The pair number is a number unique to a pair of P-VOL and S-VOL.

The pair status has two states, "synchronized (synchronization)" and "non-synchronized (asynchronization)", and in the "synchronized" state, the contents of the P-VOL and the S-VOL paired therewith are controlled to correspond. In other words, when the P-VOL is updated, the S-VOL is updated subsequently. In the "non-synchronized" state, the content of the S-VOL is not updated immediately when the P-VOL is updated, and only when a resynchronization operation is performed to the pair, the content of the S-VOL is updated to correspond to the content of the P-VOL. For example, the P-VOL 1201 whose pair number 1200 is "0" is "300", the S-VOL 1202 constituting a pair therewith is "400", and the current pair status 1203 is "synchronized".

FIG. 5 is a view showing one example of a difference bit table of a local copy. The difference bit table 121 according to FIG. 5 is a table referred to by an extension function control unit 24 controlling the local copy function, which is a table for managing the difference bit corresponding to the block number of the respective pairs. The difference bit enables to manage the update of block units. Each pair holds difference bits corresponding to respective blocks, wherein when a specific block of the P-VOL is updated when the pair status is non-synchronized, the difference bit corresponding to the block is updated from "0" to "1". For example, in a block where the block number 1210 is "10000", the pair number 0 1211 and the pair number 2 1213 are "0", no difference has occurred, but the pair number 1 1212 is "1", which means that a difference has occurred between the P-VOL and the S-VOL. As described, by managing the update information using difference bits, only the blocks where the difference bits are "1" should be copied when the resynchronization process is requested, and not all the blocks have to be copied. The difference bit table is also referred to as a copy pair difference information.

Figure 6:
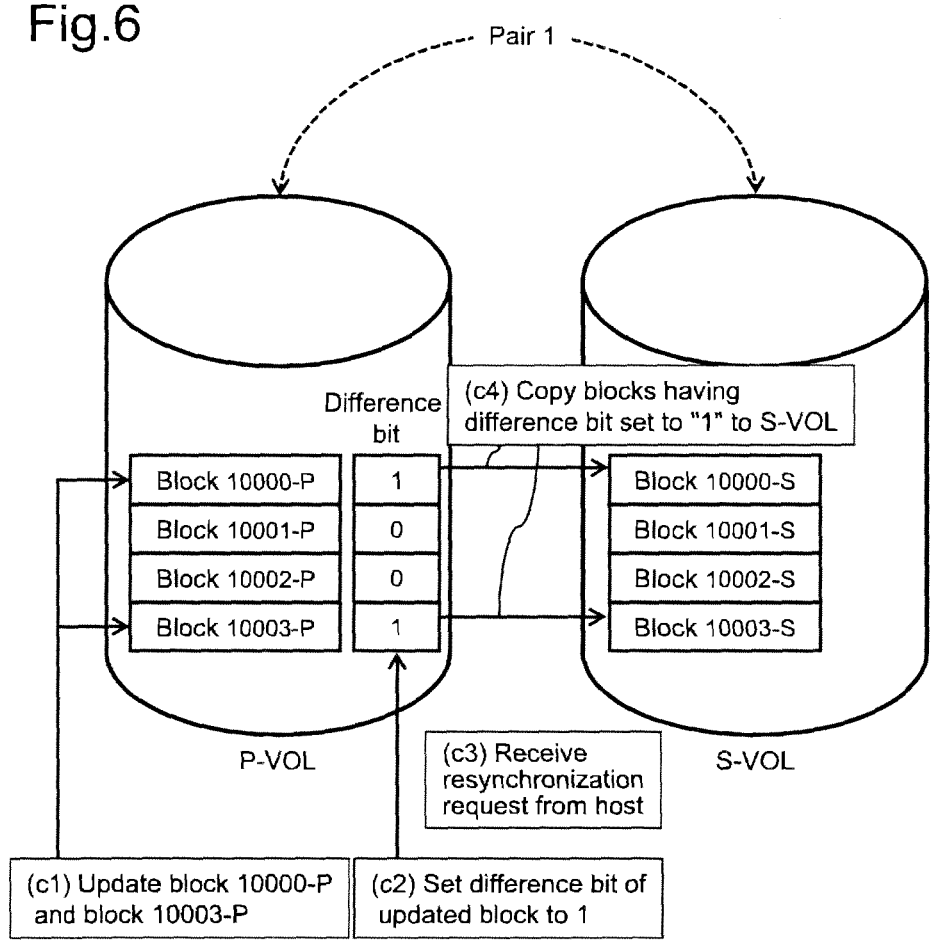
FIG. 6 is a conceptual view of the local copy.

FIG. 6 is a conceptual diagram illustrating the local copy operation. The local copy operation will now be described.

(c1) First, the block 10000-P and the block 10003-P of the P-VOL are updated based on the access from the host computer 2.

(c2) At this time, the extension function control unit 24 refers to the pair information management table 120 and finds out that the pair status of pair 1 is non-synchronized, so that the difference bits corresponding to the relevant blocks are updated. However, at this time the update data of the P-VOL is not reflected in the S-VOL.

(c3) A resynchronization request of pair 1 is issued from the host computer 2 to the storage system 4.

(c4) When the storage system 4 receives the issued resynchronization request, the extension function control unit 24 refers to the difference bit table 121, and copies the contents of the blocks where the difference bits are "1", in other words, the content of block 10000-P is copied to the block 10000-S and the content of block 10003-P is copied to the block 10003-S.

We have explained that the control information includes the aforementioned pair information management table 120 and the difference bit table 121. The pair information management table 120 is referred to during the I/O process but not updated, and is only updated when requested from the user. On the other hand, the difference bit table 121 is updated whenever an I/O process is performed, and is referred to or updated by a resynchronization request from the host computer. As described, the control information used in the storage system 4 is characteristic in that the ratio of the write process is high or the ratio of the read process is high.

Next, we will explain the functions other than the local copy function. First, we will describe the virtual volume function. The virtual volume function is a function for showing a virtual volume to a host and enabling to define a virtual volume having a capacity exceeding the capacity of the disk pool. The present function uses a control information called "logical address—physical address conversion table". When an access occurs to a logical address having a virtual volume, a physical address is allocated to the relevant logical address, and the host recognizes the access to the physical address as an access to the logical address. The logical address—physical address conversion table manages the corresponding relationship between the logical address and the physical address.

Next, we will describe the snapshot function. The snapshot function defines a single LU as an R-VOL (Real Volume), defines a V-VOL (Virtual Volume) corresponding thereto, and defines these two volumes as a snapshot pair. Upon defining a pair, the V-VOL does not have a physical area in the disk, and only has a link control information with respect to each address of the R-VOL. Therefore, it becomes possible to realize high speed access and to reduce the amount of consumption of disk capacity.

When the R-VOL is updated, the updated blocks of the R-VOL are copied to a different disk area defined as Data Pool, and the corresponding blocks on the V-VOL side is changed to have links corresponding to the relevant blocks in the Data Pool. When update of a link pointing to the R-VOL used in the snapshot function occurs, the link control information is also updated. Further, the link control information characteristically belongs to the LU. In other words, if the link control information is stored in the CTL having the LU ownership, update and reference can be performed at high speed, so that the overall write performance and read performance of the storage system 4 can be enhanced.

Figure 7:
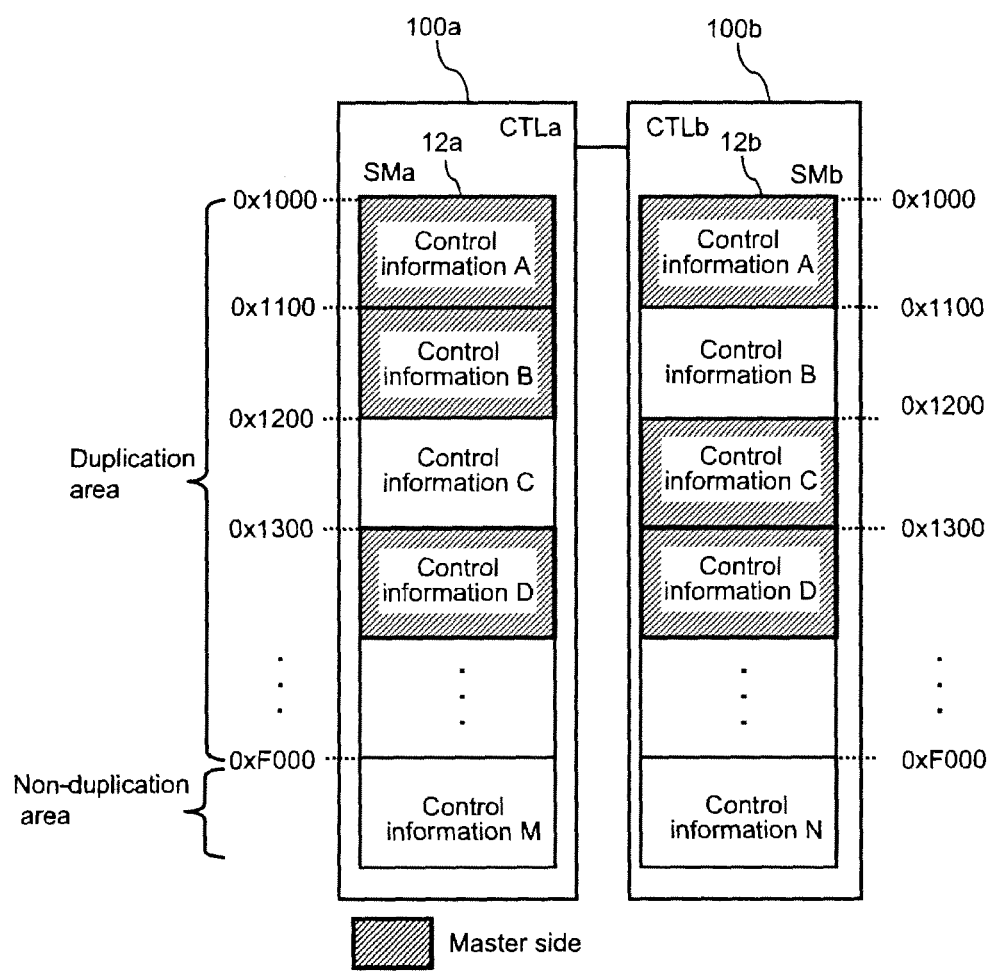
FIG. 7 is a data configuration diagram showing the concept of mapping of SMs.

FIG. 7 is a data configuration diagram showing the concept of mapping of the SM. Control information A, control information B, control information C and control information D are duplication information, so they are stored in the duplication area. In other words, taking control information A as an example, the same values are stored in the area of SM 12a having a start address of 0x1000 and in the area of SM 12b having a start address of 0x1000. Control information M and control information N are non-duplication information, so they are stored in a non-duplication area. In the non-duplication area, it is not necessary to match the value in the area of SM 12a having a start address of 0xF000 and the value in the area of SM 12b having a start address of 0xF000. Non-duplication information can be, for example, a data cache management information which is described later.

The shaded areas show the master side. The master side refers to the area of the SM which is the reference target of (read from) both the MPUa and MPUb. The duplication information is duplicated in SMa and SMb, and in order to ensure the consistency of the contents of the control information, the contents referred to from each MPU must be matched in both SMs. However, by determining the master side that the MPU refers to, it becomes possible to ensure the consistency of contents of the control information being referred to.

As described, control information B and control information C which are control information having a high write ratio (high frequency of update) have either one of the SMs set as the master side, as shown in FIG. 7, and the content stored in the master side is first updated to enable reference thereof. Thereby, the other MPUs can read the data prior to completing the process for matching the contents of the SMs, so that the access performance is enhanced. The write ratio is a value calculated by the following: (number of times of write)/(number of times of write+number of times of read). On the other hand, the read ratio is calculated by the following: (number of times of read)/(number of times of write+number of times of read), which can also be calculated by subtracting the write ratio from 1.

Further, the process for matching contents is, for example, a process for executing an exclusion process and prohibiting update from other MPUs. Further, if the control information is a control information belonging to the LU, the information can only be updated by an owner CTL having the LU ownership. By setting a master side to the SM in the owner CTL regarding such control information, the MPU in the owner CTL can refer to the internal system SM at high speed, and the read performance can be enhanced.

On the other hand, in the case of a control information having a low write ratio (low frequency of update), the exclusion process is executed at the time of update, for example, so as to complete the update while ensuring the consistency of contents so that both SMs can be referred to, as in the case of control information A. Based on such settings, the necessary control information can be referred to speedily from both MPUs via the internal system SM, so that the read performance can be enhanced. In the following description, the control information such as control information A and control information D are called "double master information" and control information such as control information B and control information C are called "single master information".

The control information having a low write ratio can be expected to have an enhanced performance during reference by setting the same as a double master information. Therefore, the control information having a low write ratio, such as the system configuration information or the pair information management table 120, should preferably be set as the double master information. The system configuration information are control information such as the capacity of the MPU memory, the disks constituting a RAID group, and the size of each LU. Since these control information are updated only when the system configuration is changed, the write ratio is extremely small, close to zero.

Control information having a high write ratio and belonging to the LU is set as a single master information, and the master side thereof is set to the SM of the owner CTL. Thereby, control information can be updated without performing processes such as an exclusive control process during update of the control information, and the high-speed internal system SM can be referred to during reference, so that the access performance can be enhanced. Such control information include the logical address—physical address conversion table or the difference bit table 121 of the virtual volume function. Since the table is a control information having a high write ratio and being frequently updated during I/O processing, it should preferably be set as the single master information.

As for the single master information having a high write ratio but does not belong to LUs, the write performance can be enhanced by updating the same without performing exclusion control or other processes during update. For example, statistical information related to the frequency of I/O or the like corresponds to a single master information having a high write ratio but does not belong to LUs, and is updated every time an I/O process is performed. Therefore, such control information is set as the single master information and set so that the master side is not biased to one of the SMs for example by determining the master side in a round-robin fashion.

FIG. 8 is a view showing one example of a control information characteristics table. The control information characteristics table 122 is a table for managing the characteristics of respective types of control information, which is composed of a write ratio field 1221, a control information field 1222 belonging to LU, and a belonging LU number field 1223 corresponding to a control information name field 1220. The write ratio field 1221 stores a write ratio which denotes the frequency of update of control information, the control information field 1222 belonging to LU stores information whether the control information belongs to an LU or not, and a belonging LU number field 1223 stores the LU number when the control information belongs to an LU. By referring to the control information characteristics table 122 via the MPU, it becomes possible to determine the characteristics of the various control information.

As described, based on the write ratio of the respective control information (and the read ratio (read ratio=1−write ratio) calculated from the write ratio), it is possible to determine whether the control information should be set as a double master information or as a single master information. Further, the write ratio can be set in advance during system configuration of the storage system 4, or can be set by the user. Furthermore, the write ratio can be updated dynamically based on the information monitored by the storage system 4.

Next, we will describe as one example of a method using a write ratio and a read ratio as access characteristics for determining the double master information/single master information. The determination method selects a double master information or a single master information so as to minimize the overhead of the overall accesses to the respective control information.

At first, the read ratio is referred to as Cr and the write ratio is referred to as Cw. The read ratio Cr and the write ratio Cw can be determined when configuring the storage system 4 or can be determined dynamically through monitoring.

Next, the overhead of read access when double master information is set is referred to as R_double and the overhead of write access is referred to as W_double. The overhead of read access when single master information is set is referred to as R_single and the overhead of write access is referred to as W_single.

W_double is a value having added to the W_single the overhead corresponding to the exclusive control (exclusive write process). R_double represents an internal system SM read overhead, and R_single also represents an internal SM read overhead when the control information is based on the LU ownership. In the case of a control information that is not based on LU ownership, it is assumed that the internal system SM read and the external system SM read have 50% chances of occurrence, and the R_single takes an average value of the internal system SM read and the external system SM read.

Based on the above-described values, the CTL calculates an overall overhead OH_double when the respective control information are set as double master information and an overall overhead OH_single when the respective control information are set as single master information via the following expressions 1 and 2. Based on the two calculated values, the smaller one of the double master information or the single master information is selected. The CTL stores the selected results in a master type field 1101 corresponding to an address field 1100 storing the respective control information in the master side information table 110.

$$OH\_double = R\_double \times Cr + W\_double \times Cw \quad \text{Expression 1}$$

$$OH\_single = R\_single \times Cr + W\_single \times Cw \quad \text{Expression 2}$$

In other words, if OH_single is smaller than OH_double, the CTL will set the master type field 1101 to single master information, and in contrast, if OH_single is greater than OH_double, the CTL will set the master type field 1101 to double master information.

In the present embodiment, the write ratio is used as a criteria for determining whether an information is a double master information or a single master information, but it is also possible to use a control information access ratio within the system or an absolute value as the criteria. The determination method based on the control information access ratio within the system is a determination method performance based on the ratio of update to the relevant control information with respect to the update of all control information within the system. The determination method restricts the number of simultaneous usable resources and the number of updates, and is effective when exclusively updating control information or the like.

In the determination method using an absolute value, selection of the double master information or the single master information is performed based on whether the number of updates is greater than a threshold value or not. This determination method is advantageous since the determination program can be constructed easily, and since only the number of times of write should be acquired, the overhead of monitoring is maintained small even when the number of times of write is varied dynamically. Further, methods other than those described above or a combination of described determination methods can be adopted.

Further, the control information field 1222 belonging to LU in the control information characteristics table 122 of FIG. 8 shows whether each control information belongs to an LU or not. If the control information field 1222 is "YES", the owner CTL in charge of processing the control information is determined, and the belonging LU information is stored in the belonging LU number field 1223. For example, the LU number to which the difference bit table 121 belongs is "202". On the other hand, when the control information field 1222 is "NO", there is no LU number to which it belongs (the belonging LU number field 1223 is "NULL"), and the owner CTL is not determined.

FIG. 9 is a view showing one example of a control information address table. The control information address table 123 is a table for managing the address area in the MPU memory 102 storing the respective control information shown in FIG. 7, and is composed of an address field 1230 and a control information name field 1231. The MPU can refer to the control information address table 123 to determine what type of control information is stored in each address of the SM. For example, a control information having a control information name 1231 of "pair information management table" is stored in the address range "0x10000x10FF (hexadecimal)" of the address field 1230. Similarly, a control information having a control information name 1231 of "difference bit table" is stored in the address range "0x1100-0x11FF (hexadecimal)". Obviously, the "pair information management table" and the "difference bit table" of FIG. 9 are the same as the control information names stored in the control information name 1220 of FIG. 8.

The address and the control information name satisfy a n:1 relationship, and a certain type of control information can be stored in a plurality of address areas. The pair information management table is an example of such type of information, and the table is also stored in the address range "0x1400-0x14FF". Further, control information A, control information B, control information C and control information D of FIG. 7 respectively correspond to the pair information management table, the difference bit table, the statistical information and the system configuration information of FIG. 9.

FIG. 10 is a view showing one example of an LU (Logical Unit) ownership table. The LU ownership table 124 is for managing the owner CTL for controlling the LU, and is composed of an LU number field 1240 and an LU ownership field 1241. The MPU can determine the owner CTL of each LU by referring to the LU ownership table 124. The LU number is a unique number assigned to identify each LU. The LU ownership field 1241 stores either "CTLa" or "CTLb". For example, the owner CTL of the LU having "201" stored in the LU number field 1240 is "CTLa" as shown in the LU ownership field 1241. The control information in which the LU number is "201" can be determined as a "pair information management table" based on the control information characteristics table 122.

FIG. 11 is a view showing one example of a master side information table. A master side information table 110 is a table for managing the corresponding relationship of the address in the MPU memory 102 storing the various control information of FIG. 7, the master type and the master side. The master side information table 110 is composed of an address field 1100, a master type field 1101 corresponding to the address field 1100, and a master side field 1102. The MPU refers to the master side information table 110 when accessing a SM, and based on the reference result, the MPU can determine how to access the control information stored in each address.

The master type field 1101 stores whether the information is a "single master information" or a "double master information". The master side field 1102 stores whether the master side of the single master information is "SMa" or "SMb". However, if the information is a double master information, the master side field 1102 stores "NULL". When the system is started, the master side field 1102 of all the control information is initially set to "double master information". The reason for such setting is because the MPU refers to the master side information, table during the initialization process while starting the system.

Figure 12:
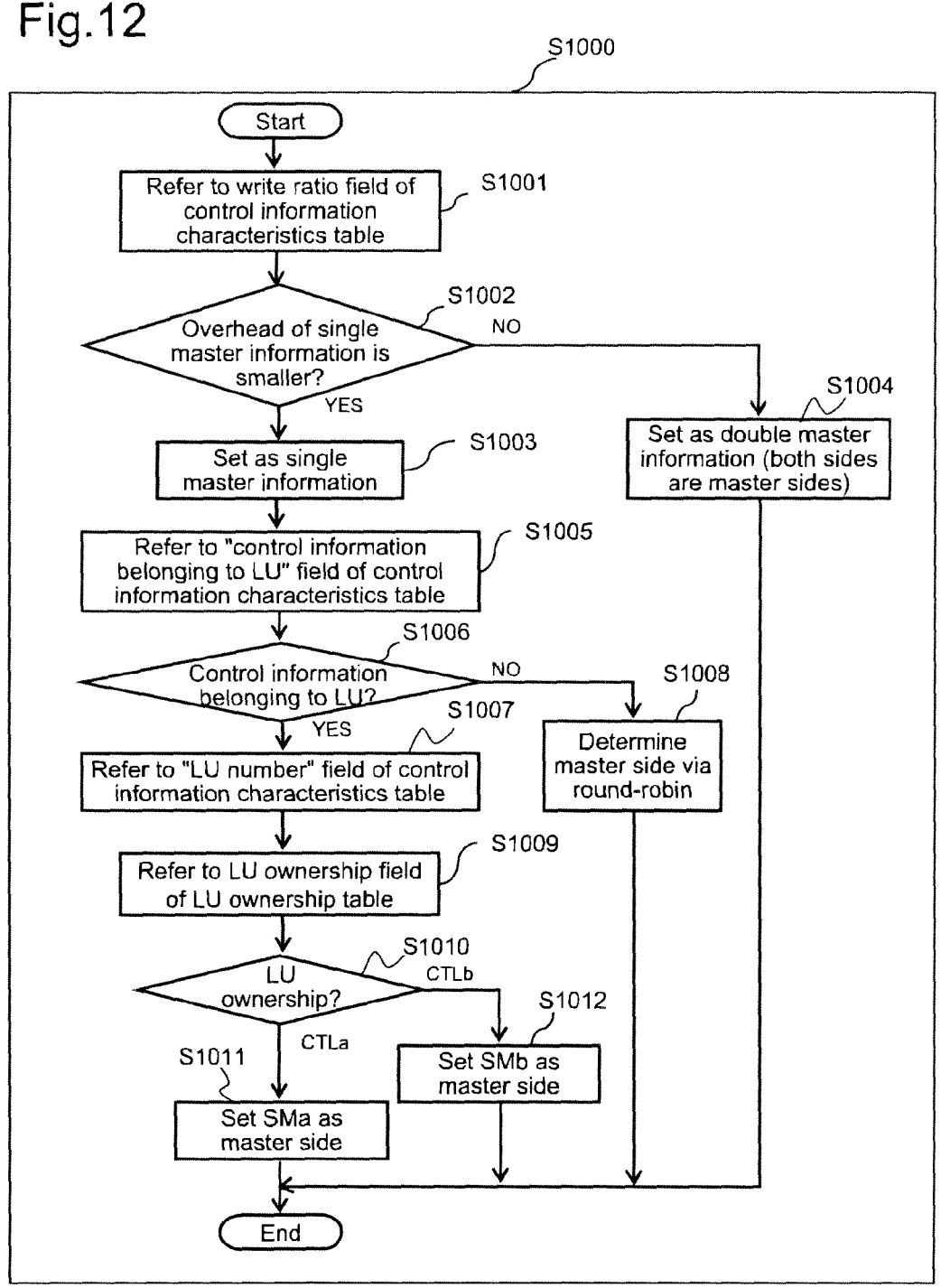
FIG. 12 is a flowchart showing a master side setting process.

FIG. 12 is a flowchart illustrating a master side setting process S1000. The method for setting the master side for enhancing the access performance from the MPU to the SM and the access performance of the overall storage system is described with reference to FIG. 12. The master side setting process S1000 is an initial setting process during starting of the storage system, wherein the MPU executes a configuration management unit 21 which is a program and sets the master side of each control information. That is, the MPU executes a master side setting process S1000 for each address field 1230 of the control information address table 123, and stores the result of the process in the master side information table 110 of FIG. 11. In the master side setting process S1000, the MPU refers to the control information characteristics table 122, the control information address table 123 and the LU ownership table 124. Further, although not clearly illustrated in the drawings and the following description, these tables are control information stored in the SM. The MPU implements an SM access control unit 23 which is a program, and stores data in the table and refers to the data therein.

When the MPU executes the master side setting process S1000, the MPU acquires the SM address, that is, the values (address ranges) of each line of the address field 1230 in the control information address table 123 shown in FIG. 9. When the process is started, the MPU first refers to the write ratio field 1221 of the control information characteristics table 122 of FIG. 8, and computes the overall overhead OH_double of the information set as the double master information and the overall overhead OH_single of the information set as the single master information using aforementioned expressions 1 and 2 (step S1001). Thereafter, the MPU compares the computed overall overhead OH_double of the information set as the double master information and the overall overhead OH_single of the information set as the single master information, and determines whether the overall overhead OH_single of the information set as the single master information is smaller or not (step S1002).

As a result of the determination, if the overall overhead OH_single of the information set as the single master information is determined to be greater (read performance is prioritized over write performance) (step S1002: No), the relevant control information should be set as double master information, so the MPU sets the master type filed 1101 corresponding to the control information address to "double master information" while maintaining the master side field 1102 to "NULL", and ends the process (step S1004).

The control information set as "double master information" are, for example, the information in which the control information name 1220 in the control information characteristics table 122 of FIG. 8 is "pair information management table" (pair information management table 120 stored in the area of the shared memory 12 in FIG. 2) or the "system configuration information". Therefore, the MPU sets the master type field 1101 corresponding to addresses "0x1000-0x10FF" and "0x1300-0x13FF" in the address field 1100 storing the pair information management table 120 and the system configuration information to "double master information" and the master side field 1101 thereof to "NULL".

The double master information must perform an exclusive control to retain the consistency of two SMs at the time of update, and the overhead of the process is high. However, since the same contents are stored in SMa and SMb and each MPU can refer to the SM in their internal system, a high speed read access is enabled and the overall access performance of the storage system 4 can be enhanced.

On the other hand, if the overall overhead OH_single of the information set as single master information is small (step S1002: Yes), the MPU stores "single master information" in the master type field 1101 corresponding to the address of the control information (step S1003). The control information set as the "single master information" are, for example, the "difference bit table" stored in the control information name 1220 of the control information characteristics table 122 of FIG. 8 (the difference bit table 121 stored in the shared memory 12 in FIG. 2) or the "statistical information".

Therefore, the MPU sets the master type field 1101 corresponding to addresses "0x1100-0x11FF" and "0x1200-0x12FF" in the address field 1100 storing the difference bit table and the statistical information to "single master information". The single master information sets either one of the SMs as master side, wherein during reference, there is a possibility that the SM in an external system is set as the read target, so the read performance may be deteriorated compared to the double master information. However, since it is not necessary to maintain consistency between two SMs (there is no need to perform the exclusive write process mentioned later), the write performance is higher than the double master information.

Next, the MPU refers to the control information field 1222 belonging to LU in the control information characteristics table 122 (step S1005), and determines whether the information is a control information belonging to an LU or not (step S1006). If the information is not a control information belonging to an LU as a result of the determination ("NO" is stored in the control information field 1222) (S1006: No), the CTL processing the relevant control information is not restricted, and the information can be accessed from any CTL or MPU. In that case, in order to prevent the number of master side SMs from being biased, for example, the MPU uses an algorithm such as a round-robin method to select either the SMa or the SMb as the master side, and the selected master side is stored in the master side field 1102 (step S1008) before ending the process.

The control information being the target of this process is the statistical information stored in the area where the address field 1230 stored in the control information address table 123 is "0x1200-0x12FF". Therefore, the master type field 1101 of the information having the same address "0x1200-0x12FF" stored in the address field 1100 of the master side information table 110 is set to "single master information" and the master side field 1102 is set to "SMb".

When the control information stored in the field 1222 of the control information belonging to LU of the control information characteristics table 122 is a control information belonging to an LU (S1006: Yes), the CTL processing the relevant control information, that is, the CTL having ownership thereof, is either CTLa or CTLb. Therefore, in order to determine which CTL has the LU ownership, the system refers to the belonging LU number field 1223 of the control information characteristics table 122 (step S1007). The LU ownership field 1241 of the LU ownership table 124 is referred to (step S1009) using the value (LU number) referred to in step S1007, in order to determine which CTL has the LU ownership (step S1010).

For example, the information having a control information name "difference bit table" is stored in "0x1100-0x11FF" based on the value in the address field 1230 of the control information address table 123. Further, the LU number to which it belongs is "202" based on the belonging LU number field 1223 of the control information characteristics table 122. Thus, the MPU searches the value of the LU number field of the LU ownership table 124 corresponding to value "202" stored in the LU number field 1223, and determines that the CTL having the LU ownership is "CTLb".

Next, based on the result of determination in step S1010, when the CTLa has the ownership (step S1010: CTLa), the MPU sets SMa as the master side. Further, the MPU stores "SMa" in the master side field 1102 of the master side information table 110 (step S1011) and ends the process. In this case, the SM read access from the CTLa having the ownership of the relevant control information can be performed at higher speed compared to the SM read access from the CTLb of the external system.

On the other hand, if the CTLb has the ownership based on the determination result in step S1010 (step S1010: CTLb), the SMb is set as the master side, the MPU stores "SMb" in the master side field 1102 of the master side information table 110 (step S1011) and ends the process. In this case, contrary to the case where the CTLa has ownership, the SM read access to the relevant control information can be performed at a higher speed from the CTLb having the ownership. Since the CTL having the ownership of the aforementioned difference bit table is "CTLb", the MPU stores "SMb" in the master side field 1102 of the master side information table 110.

The MPU stores the master type (double master information or single master information) determined by the determination in S1002 to the master type field 1101, and stores the master side (SMa or SMb) determined by the result of determination in S1008 or S1010 with respect to the single master information to the master side field 1102. Thereby, the master type and the master side information can be set up in detail for each control information, and the information can further be updated if necessary, so the access to the SM 100 via the MPU and the access performance from the host computer 2 to the whole storage system 4 can be enhanced.

Figure 13:
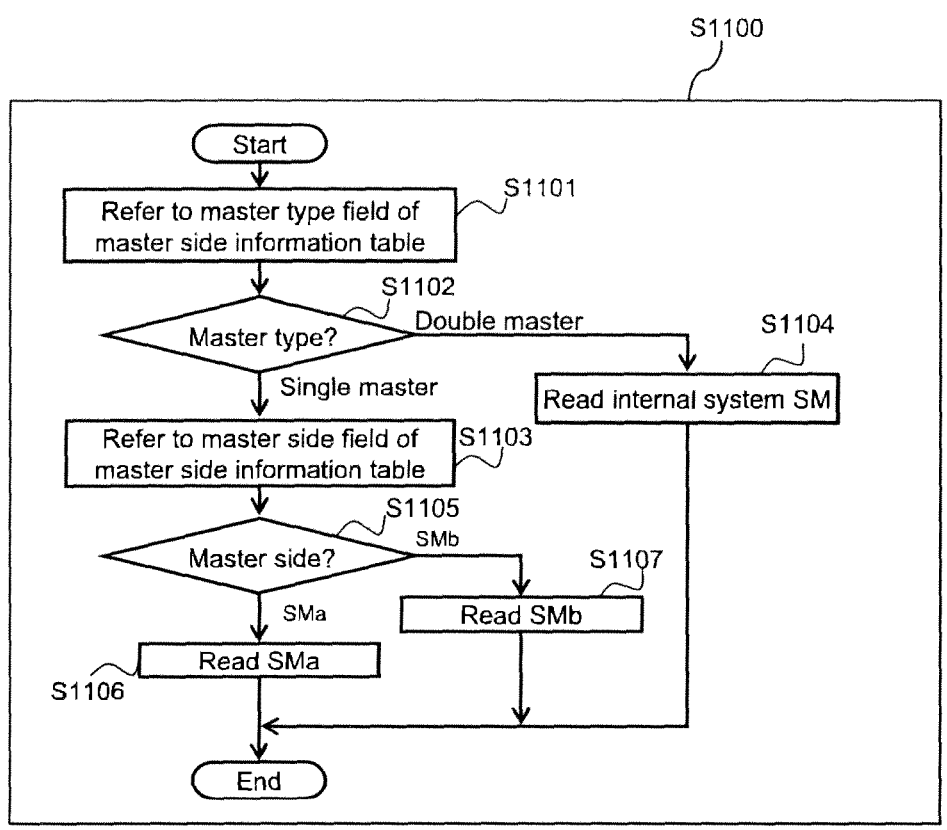
FIG. 13 is a flowchart showing an SM read process.

FIG. 13 is a flowchart showing an SM read process S1100. The read access to the SM will be described with reference to FIG. 13. The SM read process S1100 is a process routine executed when the MPU implements the SM access control unit 23 which is a program, and in order to identify the control information to be read, the SM address is given as a parameter. First, the MPU uses the address of the SM given as a parameter to refer to the master type field 1101 of the master side information table 110 (step S1101).

Next, it is determined whether the content of the master type field 1101 being referred to is a double master information or a single master information (step S1102). If it is determined that the content is a double master information (step S1102: double master), it is possible to refer to both of the SMs (either one of SMa or SMb), the SM of the internal system capable of being accessed speedily is read (step S1104) and the read process is ended.

If it is determined that the content is a single master information (step S1102: single master), the master side field 1102 of the master side information table 110 is referred to (step S1103), and it is determined which SM is set as the master side (step S1105). By determining in advance the master side to be accessed (the master side to be read according to the present process) for the single master information, it is possible to refer to the same value throughout the MPUs, and the consistency of contents can be ensured. If SMa is the master side (step S1105: SMa), the MPU reads the SMa (step S1106)

and the read process is ended. If SMb is the master side (step S1105: SMb), the MPU reads the SMb (step S1107) and ends the read process.

For example, in the case of a read access from the MPUa to a difference bit table 121, the range of the address of the SM given as the parameter is "0x1100-0x11FF". Therefore, the MPUa can read the SMa in the internal system speedily based on the information on the "single master information" stored in the master type field 1101 corresponding to that address and the value "SMa" stored in the master side field 1102 thereof. Further, the MPUa performing a read access to the pair information management table 120 can read the SMa in the internal system, so that high speed access is enabled.

Figure 14:
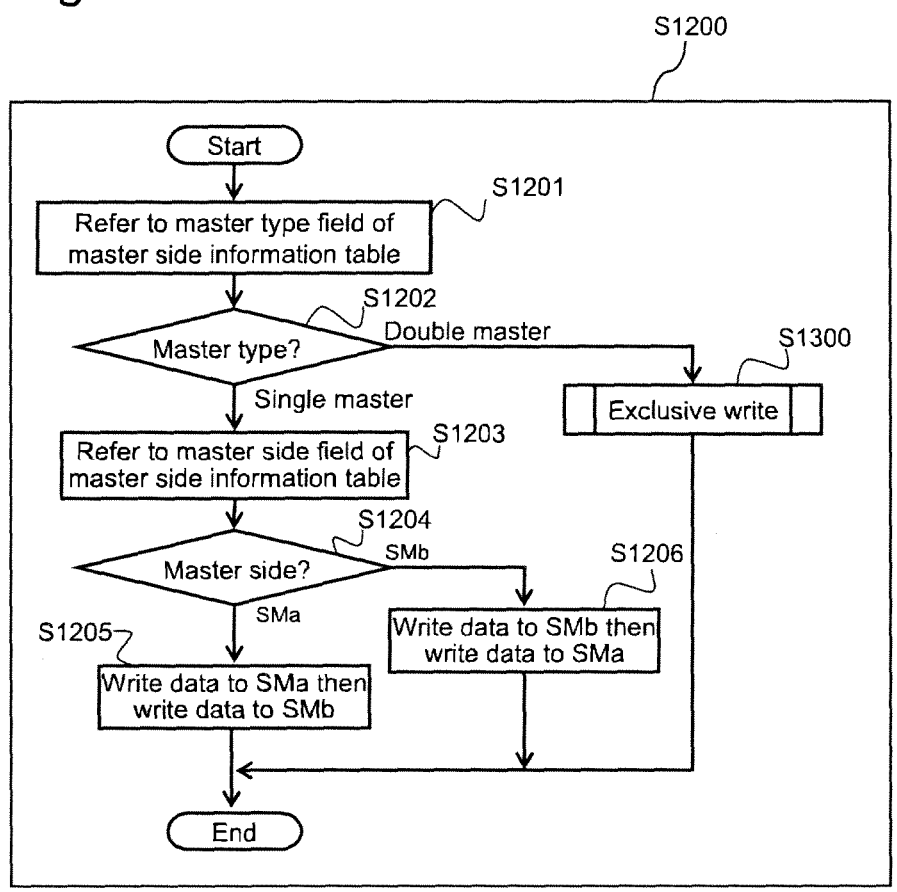
FIG. 14 is a flowchart showing an exclusive write process.

FIG. 14 is a flowchart showing an SM write process S1200. The write access to the SM will be described with reference to FIG. 14. The SM write process S1200 is a process routine executed in the process while the MPU implements the SM access control unit 23 which is a program, wherein in order to identify the control information to be written, the SM address is given as the parameter. At first, the MPU uses the address of the SM given as the parameter to refer to the master type field 1101 of the master side information table 110 (step S1201).

The MPU determines whether the content being referred to is a double master information or a single master information (step S1202). If the result of determination is the double master information (step S1202: double master), the MPU implements the exclusive write process S1300 of FIG. 15. The exclusive write process is a process for updating both SMs while performing exclusion control which is a process for retaining the consistency of the values of SMa and SMb.

If the result of determination is the single master information (step S1202: single master), the MPU refers to the master side field 1102 of the master side information table 110 (step S1203), and determines which SM is the master side (step S1204).

If the master side is SMa according to the result of determination (step S1204: SMa), data is written to the SMa at first to prioritize updating of the master side SMa. Continuously, the data is written to the SMb (step S1205), and the write process is ended. If the master side is SMb according to the result of determination (step S1204: SMb), data is similarly written to the SMb at first to prioritize updating of the master side SMb. Continuously, data is written to the SMa (step S1206) and the write process is ended.

Figure 15:
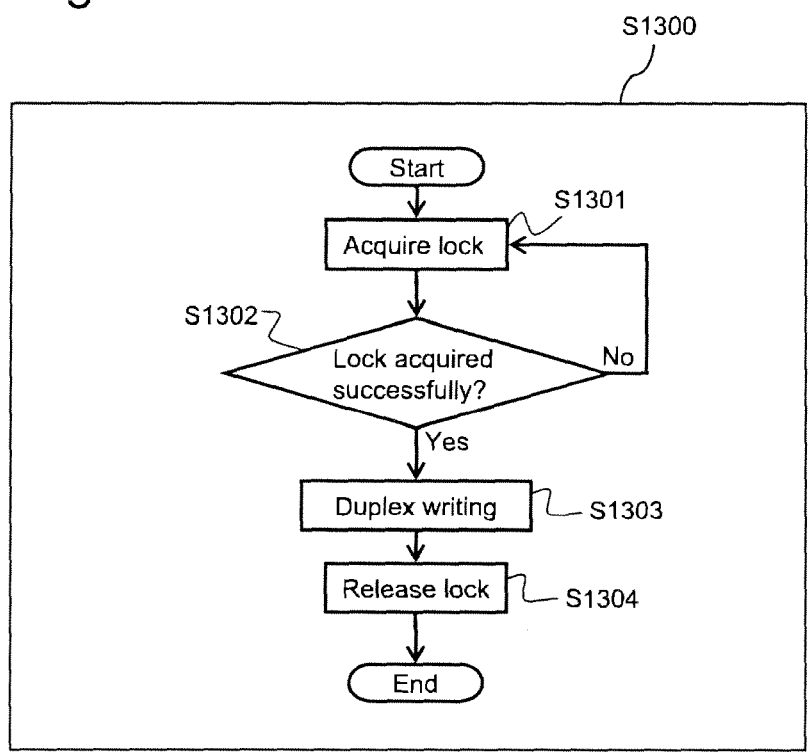
FIG. 15 is a flowchart showing an SM write process.

FIG. 15 is a flowchart showing the exclusive write process S1300. The aforementioned exclusive write process (step S1300 of FIG. 14) will be described with reference to FIG. 15. The exclusive write process S1300 is implemented during the SM write process S1200 or during the continuous SM write process S1400 described in detail later, wherein at the time of starting the process, the address of the SM to be subjected to the write process is given as a parameter. The exclusive write process is a process performed to maintain the consistency of the contents of SMa and SMb as described in the SM write process.

First, we will describe the necessity of the present process. For example, when the MPUa in the CTLa and the MPUb in the CTLb issue a write command using a different data to the same address in SMa and SMb substantially simultaneously, the contents of SMa and the contents of SMb of the write target address will differ and inconsistency occurs. In other words, when a write command is issued from the MPUa, the update of the SMa in the internal system is completed first and then the SMb is updated. On the other hand, when a write command is issued from the MPUb, the update of the SMb in the internal system is completed first and then the SMa is updated. Therefore, when update is performed, the SMa will store the contents of the write command of MPUb and the SMb will store the contents of the write command of MPUa, according to which the updated SMa and SMb will store different contents. Therefore, the present exclusive write process prevents data inconsistency among SMs and maintains consistency (integrity).

Next, the process operation will be described with reference to FIG. 15. When the exclusive write process S1300 is started, at first, a process of acquiring a lock is performed (step S1301). The process of acquiring a lock is a process for enabling only a single MPU to update the data of the SM, and during acquisition of the lock, the MPU other than the specific MPU is controlled so as not to update the SM. The acquisition of the lock is performed using a mechanism having an exclusive function such as a semaphore resister. According to the method, for example, an atomic command such as compare-and-swap is issued to the semaphore resister, and when the value of the semaphore resister is "0", the value is rewritten to "1" to determine that the lock has succeeded, and when the value of the semaphore resister is "1", it is determined that the lock has failed since another MPU has already acquired the lock. As described, it is possible to control the system to prevent the other MPU from updating the SM when a certain MPU has acquired the lock. At first in process S1300, it is determined whether the acquisition of the lock has succeeded or not (step S1302), and if acquisition has failed (step S1301: No), the procedure returns to step S1301 and performs the lock acquisition process again.

Next, if the MPU succeeds in acquiring the lock (step S1302: Yes), the MPU writes the same data into the SMa and the SMb (step S1303 "duplex writing"). Finally, the lock is released (step S1304) and the exclusive write process is ended. The lock releasing process is, for example, a process of rewriting the value of the semaphore resister set to "1" during acquisition of the lock to "0".

Figure 16:
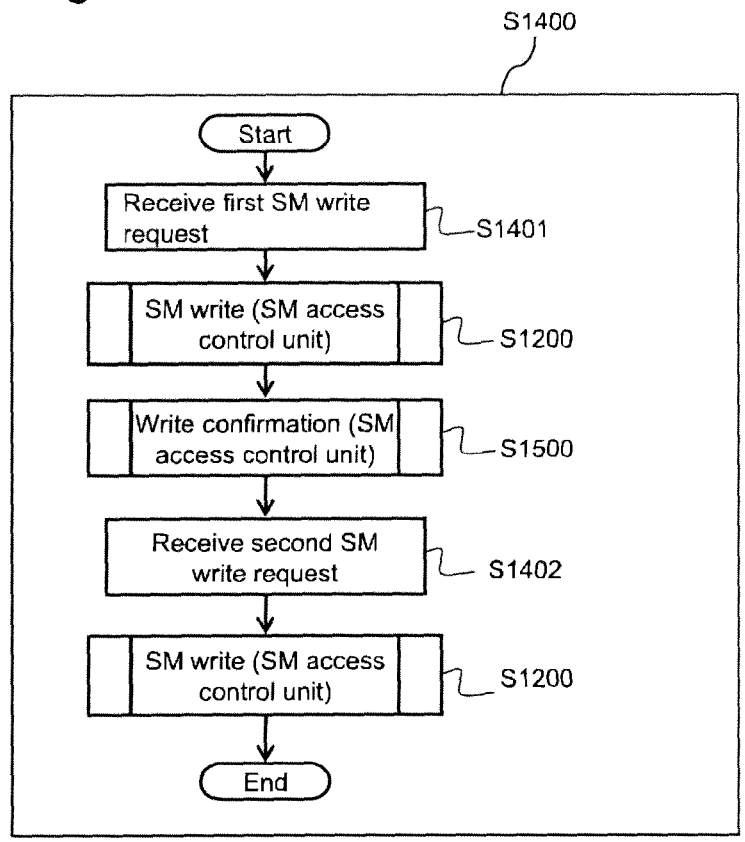
FIG. 16 is a flowchart showing a write confirmation process.

FIG. 16 is a flowchart of the process S1400 when two SM write commands are issued continuously. The processing method when a continuous write access to the SM occurs will be described with reference to FIG. 16. When a plurality of write commands are issued continuously, it is necessary to ensure the order of the write commands in order to maintain the consistency of data. In order to do so, the completion of the former write process must be first confirmed before starting the next write operation. Therefore, the SM access control unit 23 executes the process of S1400 to ensure the order of the write operation and to maintain the consistency of data. However, it is also possible to perform the plurality of SM write operations in a similar process as process S1400 on the application side when performing continuous SM write processes, so the SM access control unit 23 is not necessarily required to execute the process S1400. FIG. 16 illustrates an example of a process where two SM write processes are performed continuously, but it is also possible to perform three or more continuous write operations.

At first, when the process S1400 is started, the SM access control unit 23 receives a first SM write request (step S1401). After receiving the first SM write request, the SM access control unit 23 invokes an SM write process S1200. Thereafter, the SM access control unit 23 invokes a write confirmation process S1500.

The write confirmation process is a process for confirming that the former write operation has completed successfully, wherein the completion of the write confirmation process means that the former write process has completed. In other words, when a completion response is returned from the write confirmation process S1500, it means that the first write process has completed. Next, the SM access control unit 23 receives a second SM write request (step S1402).

After receiving the second SM write request, the SM access control unit 23 invokes the SM write process S1200 again. If no SM write occurs thereafter, there is no need to perform write confirmation, so the continuous write process to the SM is ended. If there is a third or subsequent SM write requests, the write confirmation process 1500, the write request reception and the SM write process 1200 are sequentially performed in a similar manner as the second SM write request.

Figure 17:
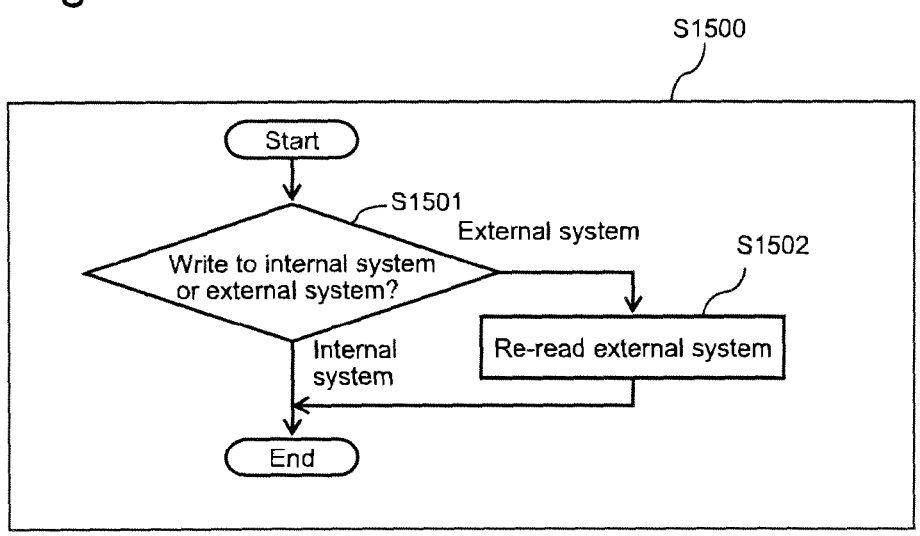
FIG. 17 is a flowchart showing a process when SM write occurs continuously.

FIG. 17 is a flowchart showing the write confirmation process S1500 of FIG. 16. The write confirmation process is described with reference to FIG. 17. The write confirmation process is a process routine invoked via the SM access control unit 23, wherein the address of the SM to be written, the CTL number (CTLa or CTLb) in charge of the command process and the content of data to be written are given as parameters. The write confirmation process is a process used in the multiple write process S1400 or the like for confirming whether the write operation has completed successfully.

First, it is determined whether the write operation subjected to determination is a write operation of an internal system SM or a write operation of an external system SM (step S1501). If it is determined that the write operation targets an internal system SM (step S1501: internal system), the write operation is a non-posted write operation so the write confirmation process is ended immediately. A non-posted write is a write operation having a completion response returned when the write operation is completed. For example, if data is written to the internal system SM using a store command or the like, the store command will not return a completion response until the write is completed. Therefore, when the store command is executed and a completion response is received, it is ensured that the write operation has completed successfully.

On the other hand, if it is determined that the write operation targets an external system SM (step S1502: external system), the write operation is a posted write operation. Therefore, a read operation is performed to the address in which data is written, the written value and the read value are compared and confirmed whether they match so as to confirm whether the write operation has been completed successfully (step 1502) and the write confirmation process is ended. A posted write is a write process that returns a completion response before the write process is completely completed. Therefore, it is necessary to read the data in the write address and compare the data to determine whether the value is updated correctly, and to confirm the completion of the write operation. If the write operation has not been completed correctly as a result of confirmation in step S1502, a return value such as "NULL" is returned and the SM writing operation is performed again.

Figure 18:
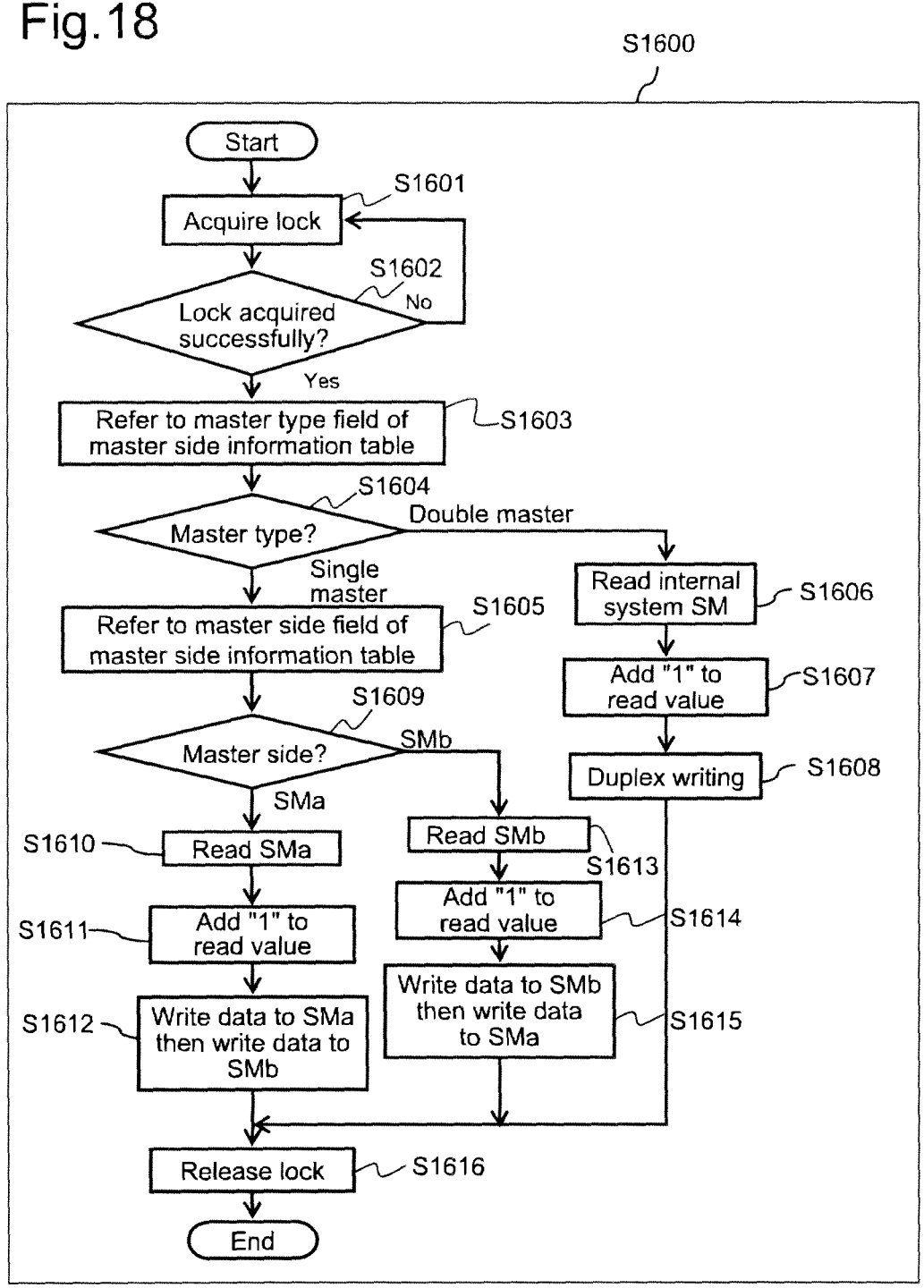
FIG. 18 is a flowchart showing an SM atomic process.

FIG. 18 is a flowchart for showing the atomic addition as an example of the atomic access to the SM. The aforementioned atomic access process (FIG. 15) will be described in detail in FIG. 18. The aim of the atomic addition is to prevent the miss of addition performed via multiple MPUs. For example, if "1" should be added to a resister having a value "1", the MPU reads the value "1", adds "1" to that value and writes the value "2" in the register. However, if a plurality of MPUs perform this operation simultaneously, for example, when the MPUa reads "1", the MPUb also reads the same value "1" simultaneously. When "1" is added to that value in the respective MPUs and the value "2" is respectively rewritten, the register is updated to value "2" as a result, and it could not be discriminated whether a certain event (adding process) has occurred once or twice.

A generic name of the process for preventing such miss from being performed among MPUs is an atomic access. According to the atomic access, when any one of the MPUs is performing atomic access, the other MPU is controlled so as not to perform atomic access. Atomic access includes an atomic comparison or the like other than the atomic addition. Atomic comparison is performed when a right to execute a certain process is acquired among multiple MPUs. The method for realizing such process utilizes a resister such as a semaphore resistor. Actually, when the MPU reads the value of the semaphore resistor and the value at that time is "0", the MPU rewrites the value of the semaphore resistor to "1". On the other hand, if the value of the semaphore resistor is "1", the MPU will not perform any process.

The atomic process S1600 of the SM is invoked by the SM access control unit 23 and the process is started. When the atomic process of the SM is started, an address is given as the parameter. First, the MPU performs a process for acquiring a lock (step S1601), and determines whether the lock acquisition has succeeded or not (step S1602). When the acquisition of a lock has failed (step S1602: No), step S1601 is performed repeatedly so as to perform the lock acquisition process again.

The method for acquiring the lock is performed for example using a semaphore resistor or the like. The semaphore resistor or the like used for acquiring a lock is common to (the same as) the semaphore resistor used in the exclusive write process S1300. That is, by using a single semaphore resistor, it becomes possible to prevent different processes which are the exclusive write process S1300 and the atomic process S1600 from being performed simultaneously to the area in the SM having the same address.

When the MPU successfully acquires a lock (step S1602: Yes), the master type field 1101 of the master side information table 110 is referred (step S1603) to determine whether the information is a double master information or a single master information (step S1604).

If the content of the master type field 1101 is a double master information as a result of the determination (step S1604: double master), the MPU is capable of reading both the internal system SM and the external system SM, so the MPU reads the SM in the internal system that can be accessed at high speed (step S1606). Thereafter, the MPU adds "1" to the read value (step S1607), writes the added value to the address read with respect to the internal system SM in step S1606, and also writes the same to the same address in the external system SM (step S1608). Finally, the lock acquired in step S1601 is released (step S1616) and the SM atomic process S1600 is ended.

If as a result of the determination, the content of the master type field 1101 is the single master information (step S1604: single master), the MPU refers to the master side field 1102 of the master side information table 110 (step S1605) and determines the master side (step S1609).

If the SMa is the master side (step S1609: SMa), the MPU reads the SMa (step S1610), adds "1" to the read value (step S1611), writes the added value to the address of the SMa read in step S1610, and also writes the same to the same address of the SMb (step S1612). Finally, the MPU releases the lock acquired in step S1601 (step S1616) and ends the SM atomic process S1600.

When the SMb is the master side (step S1609: SMb), the MPU reads the SMb (step S1613), adds "1" to the read value (step S1614), writes the added value to the address of the SMb read in step S1613, and also writes the same to the same address of the SMa (step S1615). Finally, the MPU releases the lock acquired in step S1601 (step S1616) and ends the SM atomic process S1600.

Figure 19:
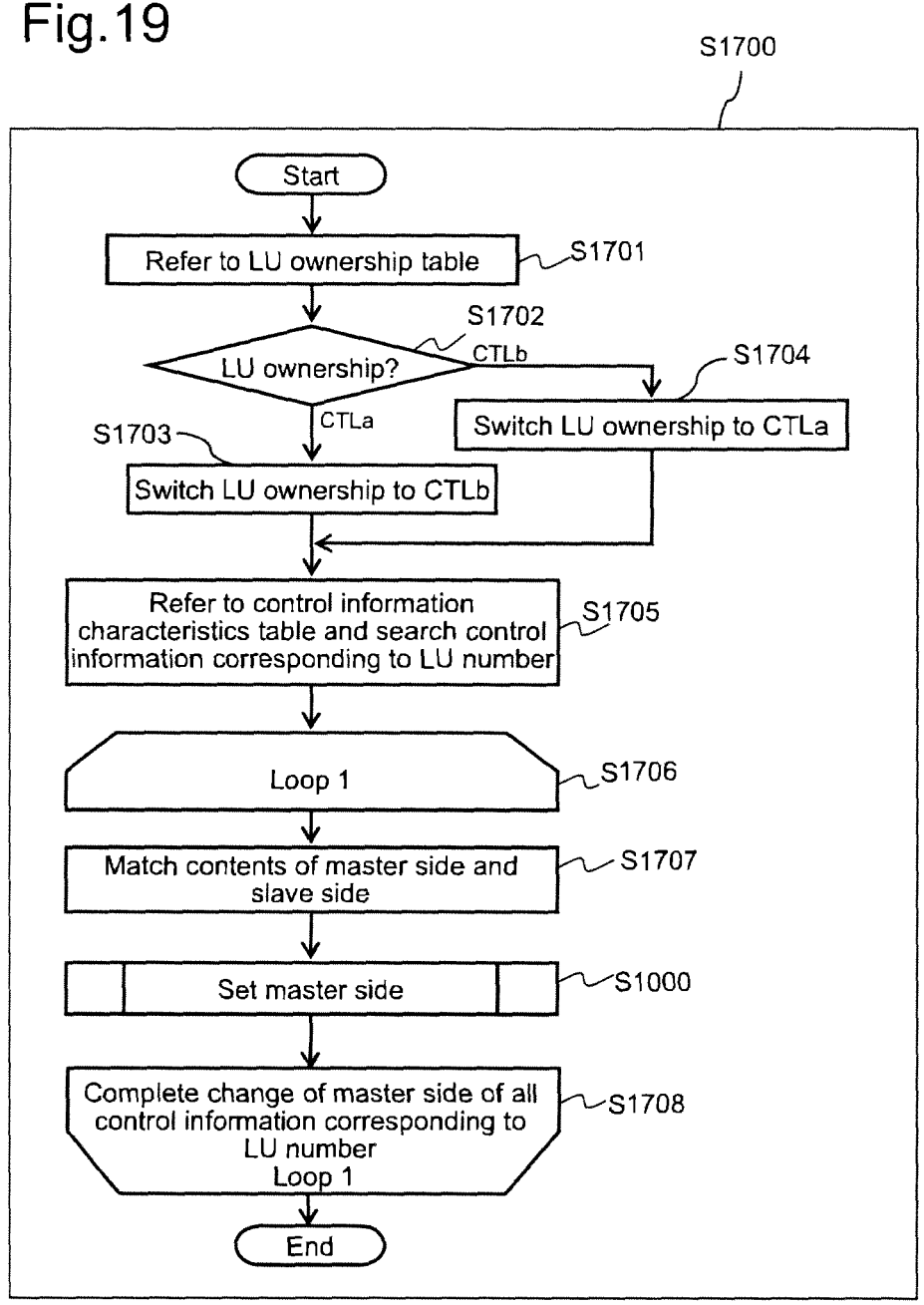
FIG. 19 is a flowchart showing a master side switching process for switching the LU ownership.

FIG. 19 is a flowchart showing the process of switching the LU ownership. An LU ownership switching process will be described with reference to FIG. 19. The process of switching the LU ownership, which is invoked by the configuration management unit 21 and having given as a parameter the LU number of the LU having its ownership switched. The configuration management unit 21 monitors the I/O accesses of the respective CTLs with respect to the respective LUs, and the LU ownership of the CTLs are switched dynamically so as to flatten (or prevent the biasing of) the load of the monitored result. It is also possible for the configuration management unit 21 to switch the LU ownership of the CTL based on the instruction from a user. When the LU ownership is switched, the ownership of the control information related to the LU is also switched, and the master side of the information must also be switched accordingly, so that the present LU ownership switching process is performed.

When the LU ownership switching process is started, at first, the MPU refers to the LU ownership field 1241 of the LU ownership table 124 (step S1701), and determines whether CTLa or CTLb has the current ownership of the relevant LU (step S1702). Thereafter, if the CTLa has the current LU ownership (step S1702: CTLa), the LU ownership is switched to CTLb (step S1703), and if the CTLb has the current ownership (step S1702: CTLb), the LU ownership is switched to CTLa (step S1704).

Next, the MPU refers to the control information characteristics table 122 in order to specify the control information related to the LU having its ownership switched, and searches the corresponding control information from the control information name field 1220 corresponding to the belonging LU number field 1223 (step S1705). For example, if the LU number having the LU ownership switched is "201" and the value of the LU ownership field 1241 of the LU ownership table 124 is switched from "CTLa" to "CTLb", the MPU searches the control information name corresponding to "201" in the belonging LU number field 1223 of the control information characteristics table 122. In this case, the "pair information management table" corresponds.

Further, if the LU number having the LU ownership switched is "202" and the value of the LU ownership field 1241 of the LU ownership table 124 is switched from "CTLb" to "CTLa", the MPU searches the control information name corresponding to "202" in the belonging LU number field 1223 of the control information characteristics table 122. In this case, the "difference bit table" corresponds.

Next, step S1706 as a loop process is performed, which executes a process S1707 for matching the contents of a master side and a slave side with respect to the searched control information and a master side setting process S1000 (FIG. 12). The conditions for ending the loop process of step S1706 is that the process S1707 for matching the contents of the master side and the slave side and the master side setting process S1000 are performed for all the control information searched in step S1705.

In other words, the master side setting process S1000 is performed repeatedly to change the master side of all the control information related to the LU having the LU ownership changed. However, according to some control information, the contents of the master side does not match the contents of the slave side (the SM which is not the master side). For example, the "pair information management table" which is the single master information in which the contents of SMa is mainly updated corresponds to this example.

Therefore, before executing the master side setup process S1000, the contents of the master side and the slave side are matched (step S1707). Actually, the master side setup process S1000 is performed after copying the contents of the master side to the slave side. When the master side setting process is completed for all the control information, the LU ownership switching process is ended (step S1708).

According to the above-described system configuration, memory configuration, various tables and various processing methods, the present invention enables to integrate the system which was composed of multiple types of memories in the prior art to a single memory which is an MPU memory. Further, the access efficiency of internal system MPUs and external system MPUs to MPU memories of the respective systems can be enhanced via the accessing master side control and LU ownership control.

Thus, the storage system can be composed of a hardware configuration equivalent to the prior art system with an inexpensive and smaller number of components by commonalizing different types of memories while maintaining a software environment having compatibility with the prior art system and maintaining system control environment. Further, the access time which is an access cost to the memory can be reduced, so that the access performance from the host computer to the storage system or the processing performance within the storage system can be enhanced.

Embodiment 2

Figure 20:
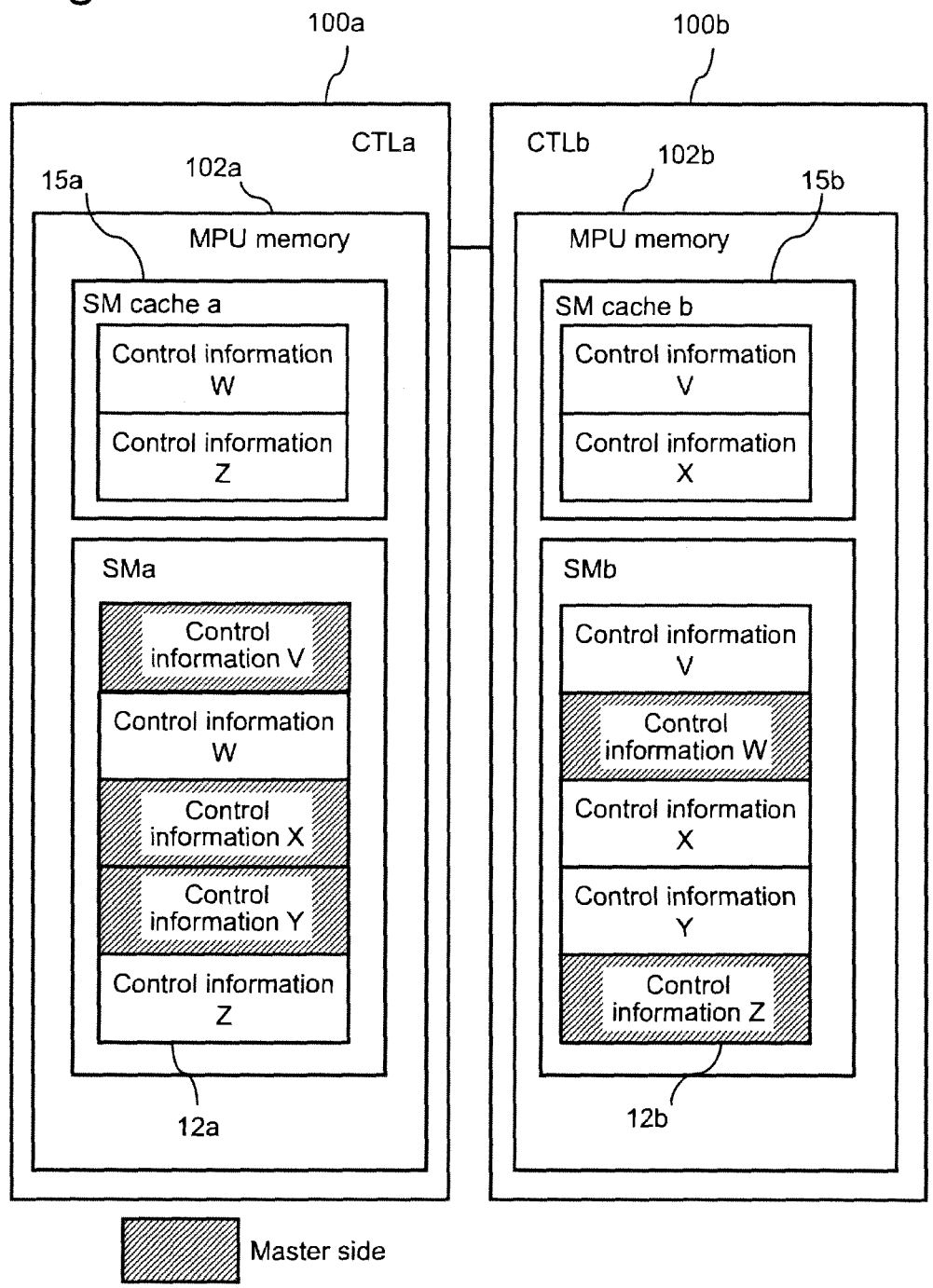
FIG. 20 is a data configuration diagram of an SM cache memory according to a second embodiment of the present invention.
Figure 21:
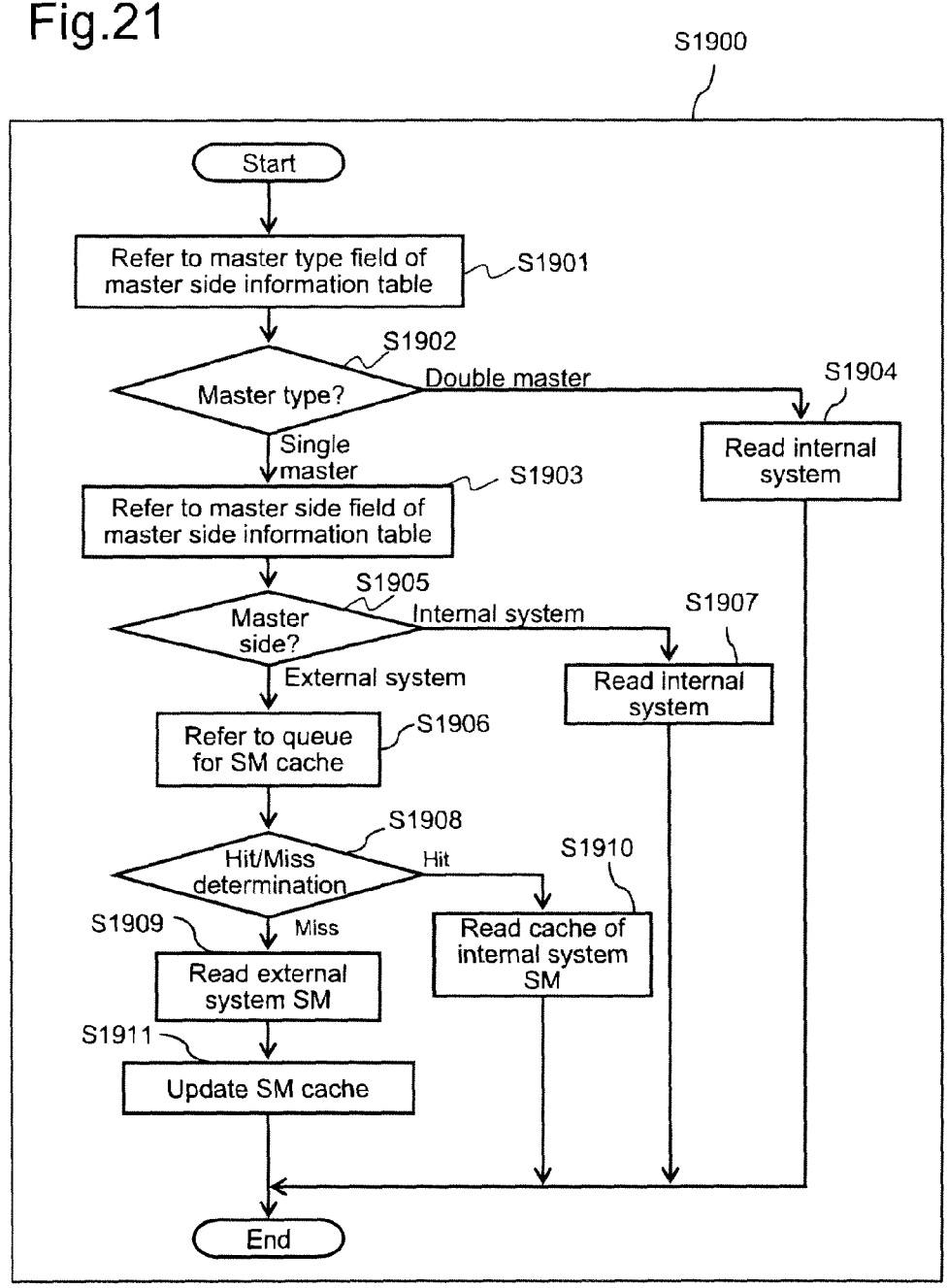
FIG. 21 is a flowchart showing a read access process using the SM cache.

FIG. 20 is a memory configuration diagram of the SM cache. FIG. 21 is a flowchart showing a read access process using the SM cache. A second embodiment related to a method for caching only the control information of the external system to the SM cache is described with reference to FIGS. 20 and 21. The characteristic feature of the second embodiment is to copy to the SM cache 15 only the control information of a single master information in which the master side is on the external system. In other words, the above-mentioned control information is the information in the SM of the external system frequently read by the MPU of the internal system. Since the speed of the read access to the SM of the external system is slower than the read access to the SM of the internal system, the read performance of the MPU can be improved by caching a portion of the contents of the control information to the internal system SM that can be accessed at high speed.

Actually, the SM access control unit 23 copies to the SM cache a (reference number 15a) the single master information having the master side set to the SMb, and copies to the SM cache b (reference number 15b) the single master information having the master side set to the SMa. For example, in the example of FIG. 20, the single master information having the SMb set as the master side are the control information W and the control information Z, so the SM access control unit 23 copies the control information W and the control information Z to the SM cache a 15a.

The single master information having the SMa set as the master side are a control information V, control information X and control information Y, but the SM cache a does not have enough capacity for copying all the control information. Therefore, the SM access control unit 23 selects the control information V and the control information X from the control information V, control information X and control information Y, and copies the same to the SM cache b. The method of selection can be, for example, a method for selecting and copying the control information most recently referred to in said order. According to the method for caching the single master information having the master side set to the SMb to the SM cache a in the internal system, the MPUa of the internal system can read the necessary control information from the internal system MPU memory 102a that can be accessed at high speed.

FIG. 21 is a flowchart showing the SM read process S1900 when the SM cache is used. The process for reading the information cached in the SM cache is invoked by the SM access control unit 23 and having the address of the read target control information given as a parameter. First, the MPU refers to the master type field 1101 of the master side information table 110 corresponding to the address given as the parameter (step S1901), and the master type (whether the information is a double master information or a single master information) is determined (step S1902).

If the content of the master type field 1101 is a double master information according to the result of the determination (step S1902: double master), high-speed access is enabled since the MPU of the internal system can read the SM of the internal system. Therefore, the MPU reads the internal system SM (step S1904) and ends the read process.

If the content of the master type field 1101 is a single master information according to the result of the determination (step S1902: single master), the MPU refers to the master side field 1102 of the master side information table 110 (step S1903) and determines whether the master side is in the internal system or the external system (step S1905). If the master side is in the internal system SM (step S1905: internal system), the MPU reads the internal system SM (step S1907) and ends the read process.

If the master side is in the external system according to the result of the determination (step S1905: external system), a queue for the SM cache is referred to (step S1906), and a hit/miss hit (hereinafter referred to as hit/miss) determination is performed (step S1908). The hit/miss determination determines whether the read target control information exists in the internal system SM cache or not, and when the result is "hit", the read target control information is in the internal system SM cache and can be accessed at high speed. On the other hand, when the result is "miss", the read target control information is not in the internal system SM cache, so the information in the external system SM must be read and a long access time is required.

If the read target control information is in the internal system SM cache based on the result of determination (step S1908: hit), the MPU reads the internal system SM cache that can be accessed at a higher speed than the external system SM (step S1910) and ends the read process. The control information corresponding to this example is the "control information V" stored in the SM cache b in FIG. 20.

If the read target control information is not in the internal system SM cache based on the result of determination (step S1908: miss), the MPU reads the external system SM (step S1909). Thereafter, the control information having been read is copied in the internal system SM cache (step S1911) and the read process is ended. By copying the control information existing only in the external system SM to the internal system SM cache, if the MPU attempts to read the control information again, the MPU can read the information from the internal system SM cache capable of being accessed at high speed. The corresponding control information is the "control information Y" which is neither stored in the SMb nor the SM cache b in FIG. 20.

As described, according to the caching control of the second embodiment, it becomes possible to enhance the access performance of the storage system by reducing the access time which is the access cost for accessing the memory while maintaining the compatibility of the software environment and the system control environment, similar to the first embodiment.

Embodiment 3

Figure 22:
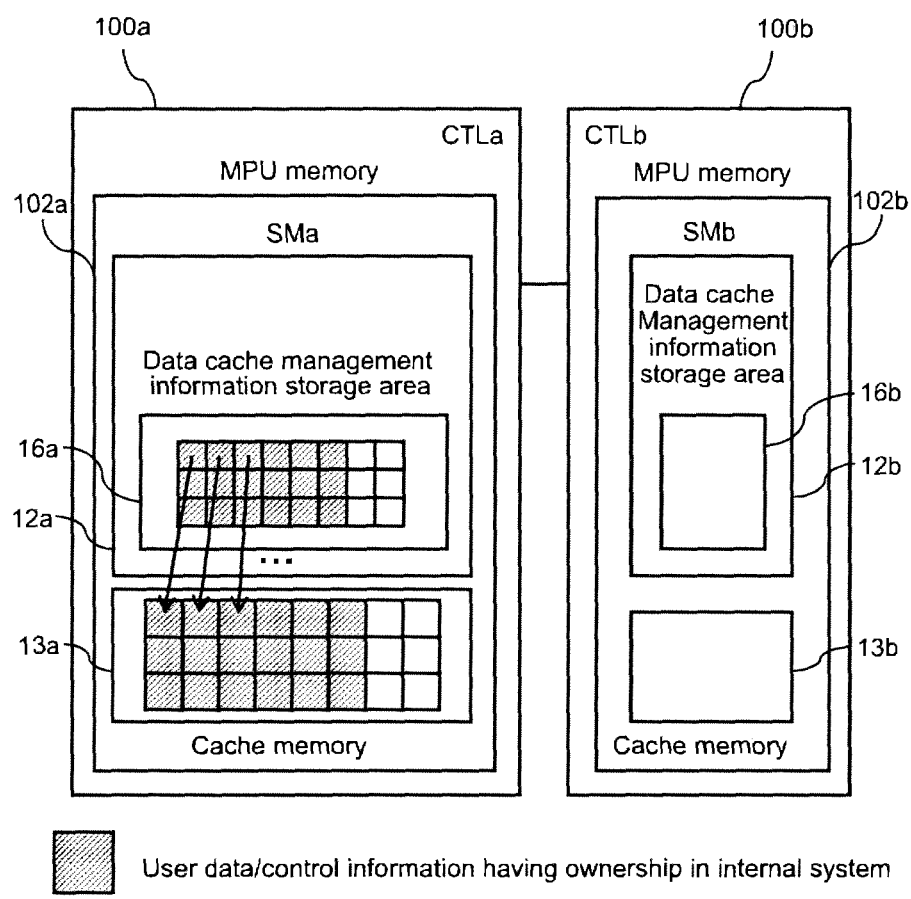
FIG. 22 is an explanatory view conceptually showing the arrangement of LU ownership of the data cache management information according to the third embodiment of the present invention.
Figure 23:
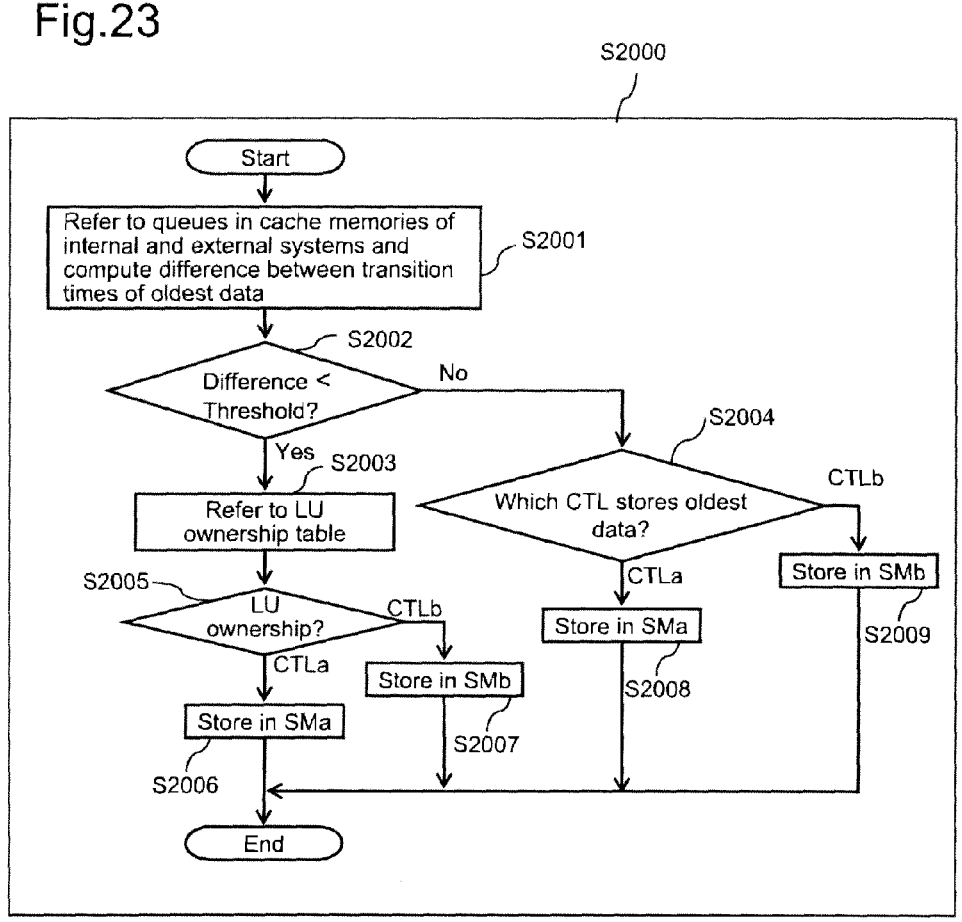
FIG. 23 is a flowchart showing the process for arranging the data cache management information according to the LU ownership.

FIG. 22 is an explanatory view conceptually showing the arrangement of LU ownership of the data cache management information according to the third embodiment of the present invention. FIG. 23 is a flowchart showing the process for arranging the data cache management information according to the LU ownership. A third embodiment of the present invention regarding a method for arranging the data cache management information in the SM of the CTL having the ownership thereof will be described with reference to FIGS. 22 and 23.

First, the method for arranging the data cache management information will be described with reference to FIG. 22. Since the data cache management information of FIG. 22 is a non-duplication information, it is arranged in the non-duplication area which is the area subsequent to address 0xF000 shown in FIG. 7. Further, data cache management information is a control information stored in the data cache management information storage area 16 in the SM 12, which is information for mapping the address of the data in the cache memory 13 and the address of the disk.

In order to access a data in a certain disk in the drive unit 109, the MPU first refers to the data cache management information storage area 16a. The MPU can determine whether the accessing data exist in the cache memory or not, and can immediately determine the address of the cache memory 13a in which the data is stored.

Further, the data cache management information is arranged in the same CTL side as the user data related with the data cache management information. The reason for such arrangement is described in the following. It is assumed that prior to writing a data in a disk, the data is temporarily stored in a duplicated manner in the cache. In order to execute successful data access even if failure occurs to one of the CTLs, a set of user data and a data cache management information for accessing the data is required to be stored in the MPU memory of the other CTL that has not failed. Based on the above reasons, the user data and the data cache management information are arranged within the same CTL.

Since the user data and the data cache management information are information belonging to the LU, ether one of the CTLs having the LU ownership is in charge of processing the user data and the data cache management information. Therefore, the user data and the control information are arranged on the side of the CTL having the ownership. However, if such arrangement is continued and I/O is concentrated to one of the CTLs, the cache memory arranged on the side of the CTL to which I/O is concentrated will be used continuously while the other cache memory will not be used and will remain storing old information. A data releasing process and reallocation process are performed in order to prevent such wasting use of memory and to realize efficient memory use and access. Actually, the access time (such as the reference time or the update time) of the oldest information in both cache memories are compared, and the oldest information having the time difference exceed a predetermined threshold is released from both cache memories and new user data is stored in the freed area.

The process for releasing the cache memory area and the reallocation process will be described with reference to FIG. 23. FIG. 23 is a flowchart showing an allocation process S2000 of the data cache management information, which is a process routine invoked by the basic I/O control unit 22 which is a program, and having an address given as a parameter.

At first, the MPU implementing the basic I/O control unit 22 refers to the queue of the cache memory in the internal system and the external system. The queue is respectively equipped in CTLa and CTLb, which is a queue that stores data in the order starting from the most recently referenced data and omitting old information in order from the oldest information. The MPU provides to the data stored in the queue a transition time which is the time at which the data was first stored in the queue.

When the implementation of the data cache management information allocation process S2000 is started, the MPU first acquires the transition time (the reference time or the update time as the final access time) in the queue of the oldest data in the queues in both CTLs, and computes the difference between the two values (step S2001). Next, the MPU determines whether the difference between the two values exceeds a predetermined threshold or not (step S2002).

If the difference between the two values exceeds a predetermined threshold (step S2002: No), the MPU determines which of the two oldest data in the queues is older based on the transition times of the two data (step S2004). Based on this determination, the MPU can delete the oldest data in one of the two cache memories and add new data. For example, if the data in CTLa is oldest (step S2004: CTLa), the MPU deletes the oldest data in the queue of the CTLa, stores new data in the cache memory a, and stores the management information of the data in SMa (step S2008). On the other hand, if the data in CTLb is oldest (step S2004: CTLb), the MPU deletes the oldest data in the queue of CTLb, stores the new data in the cache memory b, and stores the management information of the data in SMb (step S2009).

If the difference between the two values is smaller than the threshold (step S2002: Yes), the MPU refers to the LU ownership table 124 (step S2003) and determines the CTL having the LU ownership of the data (step S2005). Then, the data and the management information of the data are stored in the CTL having the LU ownership, according to which the MPU is capable of reading the internal system SM, so the access performance can be enhanced.

That is, if the CTLa has the LU ownership (step S2005: CTLa), the MPU stores the data in the cache memory a, stores the management information of the data in SMa, updates the LU ownership table 124 (step S2006) and ends the process. If the CTLb has the LU ownership (step S2005: CTLb), the MPU stores the data in the cache memory b, stores the management information of the data in SMb, updates the LU ownership table 124 (step S2007) and ends the process.

As described, by applying the LU ownership control of the respective CTLs and the storage control of data management information in the MPU memory according to the present invention, it becomes possible to enhance the efficient use of the MPU memory and improve the access performance of the system. As described according to the present embodiment, the access performance of the storage system can be enhanced due to the reduction in access time which is the access cost for accessing the memory, similar to embodiments 1 and 2.

The term "table" is used in the present description to describe the information according to the present invention, but the information is not necessarily expressed via a data structure using a table, and the information can also be expressed via other data structures such as a "list", a "DB (database)", or a "queue". Therefore, in order to show that the information does not depend on the data structure, the "table", "list", "DB", "queue" and the like can be simply referred to as "information".

Further, the term "program" is used as the subject in the description, but the program is implemented via a processor to perform determined processes using a memory and a communication port (communication control unit), so that the processor such as MPU can be described as the subject. Further, the processes described as having a program as the subject can be performed by an information processing apparatus or a computer such as a management server. A portion of or all the programs can be realized via a dedicated hardware, or can be formed as modules. Obviously, the various programs can be installed in the respective computers via a program distribution server or a storage media.

INDUSTRIAL APPLICABILITY

The present invention can be applied to information processing apparatuses such as large-scale computers, mainframes or servers, or to storage devices such as storage systems.

REFERENCE SIGNS LIST

1 Computer system
2 Host computer
3 Management terminal
4 Storage system
5 SAN
6 LAN
10 Text area
11 Local memory
12 SM
13 Cache memory
15, 15a, 15b SM cache
16, 16a, 16b Data cache management information storage area
21 Configuration management unit
22 Basic 170 control unit
23 SM access control unit
24 Extension function control unit
100a, 100b CTL
101a, 101b MPU
102a, 102b MPU memory
103a, 103b DMA circuit
104a, 104b HOST_I/F
105a, 105b DRIVE_I/F
106a, 106b Management_I/F
107a, 107b NTB
109 Drive unit
110 Master side information table
120 Pair information management table
121 Difference bit table
122 Control information characteristics table
123 Control information address table
124 LU ownership table
1100 Address field
1101 Master type field
1102 Master side field
1220 Control information name field
1221 Write ratio field
1222 Control information field belonging to LU
1223 Belonging LU number field
1230 Address field
1231 Control information name field
1240 LU number field
1241 LU ownership field

The invention claimed is:

1. A storage system comprising:
   a first controller having a first processor and a first memory; and
   a second controller having a second processor and a second memory,
   wherein each of the first and the second memories includes a shared memory storing control information,
   wherein the first and second controllers are coupled to each other;
   wherein the storage system is configured to have master side information managing a master type of the control information,
   wherein the first processor is configured to:
      determine whether the control information is double master information or single master information on a basis of the master side information;
      in a case that the control information is the double master information, lock the shared memories in the first and second memories, perform an update process of the control information in the shared memories of the first and second memories, and release the lock of the shared memories in the first and second memories after the update process, the second processor being configured not to perform other update process of the control information in the shared memories of the first and second memories when the shared memories are locked; and
      in a case that the control information is the single master information, perform the update process of the control information without locking the shared memories in the first and second memories,
   wherein in a case that the control information is the double master information, the control information in the shared memories of the first and second memories is capable of being read from both the first and second processors, and
   wherein in a case that the control information is the single master information, the control information in only one of the first and second memories is capable of being read from both the first and second processors.

2. The storage system according to claim 1, wherein
   while the first processor updates the control information as double master information in the shared memories of the first and second memories, writing of data by the second processor to the shared memory in the first or second controller is not permitted until the update is completed.

3. The storage system according to claim 2, further comprising:
   a plurality of disk drives and a plurality of logical units provided from the plurality of disk drives;
   wherein one of the first controller or the second controller is assigned as a controller configured to control an I/O with respect to a logical unit for each of the plurality of logical units; and
   wherein regarding control information is single master information unique to any one of the plurality of logical units, only the control information written in the first memory or the second memory of the controller assigned to the logical unit is permitted to be read from the first processor and the second processor.

4. The storage system according to claim 3, wherein
   an update frequency of the double master information is smaller than an update frequency of the single master information.

5. The storage system according to claim 3, wherein
   a number of times of update of the double master information is greater than a predetermined threshold.

6. The storage system according to claim 3, wherein
   the double master information includes either a copy pair information of the logical unit or a system configuration information.

7. The storage system according to claim 3, wherein
   the single master information includes either difference information of a copy pair of the logical unit or a statistical information.

8. A method for controlling a storage system, the storage system comprising:
   a first controller having a first processor and a first memory; and
   a second controller having a second processor and a second memory,
   wherein each of the first and the second memories includes a shared memory storing control information,
   wherein the first and second controllers are coupled to each other,
   wherein the storage system is configured to have master side information managing a master type of the control information,
   wherein the method comprises:
      determining, by the first processor, whether the control information is double master information or single master information on a basis of the master side information;
      in a case that the control information is the double master information,
      locking, by the first processor, the shared memories in the first and second memories;
      performing, by the first processor, an update process of the control information in the shared memories of the first and second memories;
      releasing, by the first processor, the lock of the shared memories in the first and second memories after the update process;
      not performing, by the second processor, other update process of the control information in the shared memories of the first and second memories when the shared memories are locked, the control information in the shared memories of the first and second memories capable of being read from both the first and second processors;
      in a case that control information is the single master information,
      performing, by the first processor, the update process of the control information without locking the shared memories in the first and second memories,
      the control information in only one of the first and second memories capable of being read from both the first and second processors.

9. The method for controlling a storage system according to claim 8, wherein
   while the first processor updates the control information as double master information in the shared memories of the first and second memories, writing of data by the second processor to the shared memory in the first or second controller is not permitted until the update is completed.

10. The method for controlling a storage system according to claim 9, further comprising:
    assigning the first controller as a controller configured to control an I/O with respect to a logical unit of a plurality of logical units provided from a plurality of disk drives included in the storage system; and when the single master information is a control information unique to any one of the plurality of logical units, reading, using the first processor or the second processor, only the single master information written in the first memory belonging to the first controller.

11. The method for controlling a storage system according to claim 10, further comprising:
changing the controller assigned to the logical unit from the first controller to the second controller; and
after matching the contents in the first and second memories of the single master information belonging to the logical unit for which the controller has been changed, permitting the first processor or the second processor to read only the single master information written in the second memory belonging to the second controller.

12. The method for controlling a storage system according to claim 11, wherein
an update frequency of the double master information is smaller than an update frequency of the single master information.

13. The method for controlling a storage system according to claim 11, wherein
a number of times of update of the double master information is greater than a predetermined threshold.

14. The method for controlling a storage system according to claim 11, wherein
the double master information includes either a copy pair information of the logical unit or a system configuration information.

15. The method for controlling a storage system according to claim 11, wherein
the single master information includes either difference information of a copy pair of the logical unit or a statistical information.

* * * * *